United States Patent
Tomizawa et al.

(10) Patent No.: US 7,095,758 B2
(45) Date of Patent: Aug. 22, 2006

(54) MULTIPLEXING AND TRANSMISSION APPARATUS

(75) Inventors: Masahito Tomizawa, Yokosuka (JP); Takashi Ono, Yokohama (JP); Yoshiaki Kisaka, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1069 days.

(21) Appl. No.: 09/882,324

(22) Filed: Jun. 15, 2001

(65) Prior Publication Data
US 2001/0053161 A1    Dec. 20, 2001

(30) Foreign Application Priority Data
Jun. 16, 2000   (JP) .............. 2000-180928

(51) Int. Cl.
*H04J 3/04*   (2006.01)
(52) U.S. Cl. .................. 370/535; 370/503
(58) Field of Classification Search ........ 370/508, 370/509, 505, 503, 512, 535, 536, 537, 538–546, 370/375, 431, 438; 708/102; 713/400–501; 725/129; 398/43, 76
See application file for complete search history.

(56) References Cited
U.S. PATENT DOCUMENTS

| | | | | |
|---|---|---|---|---|
| 4,539,678 A | * | 9/1985 | Ambroise et al. | 370/438 |
| 4,644,536 A | * | 2/1987 | Utsumi | 370/509 |
| 4,744,082 A | * | 5/1988 | Fujimura et al. | 370/505 |
| 4,899,339 A | * | 2/1990 | Shibagaki et al. | 370/431 |
| 2002/0124030 A1 | * | 9/2002 | Enam et al. | 708/102 |

FOREIGN PATENT DOCUMENTS

JP   5-284127   10/1993

OTHER PUBLICATIONS

Tomizawa, et al., "43-Gbit/s OTN Interface Prototype", OFC 2001, Mar. 21, 2001.
Tomizawa, et al., "43-Gbit/s OTN Interface Prototype", Proceedings of the 2001 IEICE General Conference, Mar. 2001.

* cited by examiner

*Primary Examiner*—John Pezzlo
(74) *Attorney, Agent, or Firm*—Kenyon & Kenyon LLP

(57) ABSTRACT

A multiplexing and transmission apparatus including a transmitter and a receiver is provided. The transmitter includes a control pulses generating circuit generating control pulses having different phases; channel-frame generating circuits each outputting low-speed frame signal in synchronization with the control pulse; and a multiplexing circuit multiplexing the low-speed frame signals into the high-speed serial signal. The receiver includes a demultiplexer demultiplexing high-speed serial signal into low-speed frame signals; channel-frame synchronization circuits each generating a frame pulse corresponding to the low-speed frame signal; a switching circuit switching each of the low-speed frame signals to an appropriate port of the channel; and a switch controller circuit controlling the switching circuit.

16 Claims, 21 Drawing Sheets

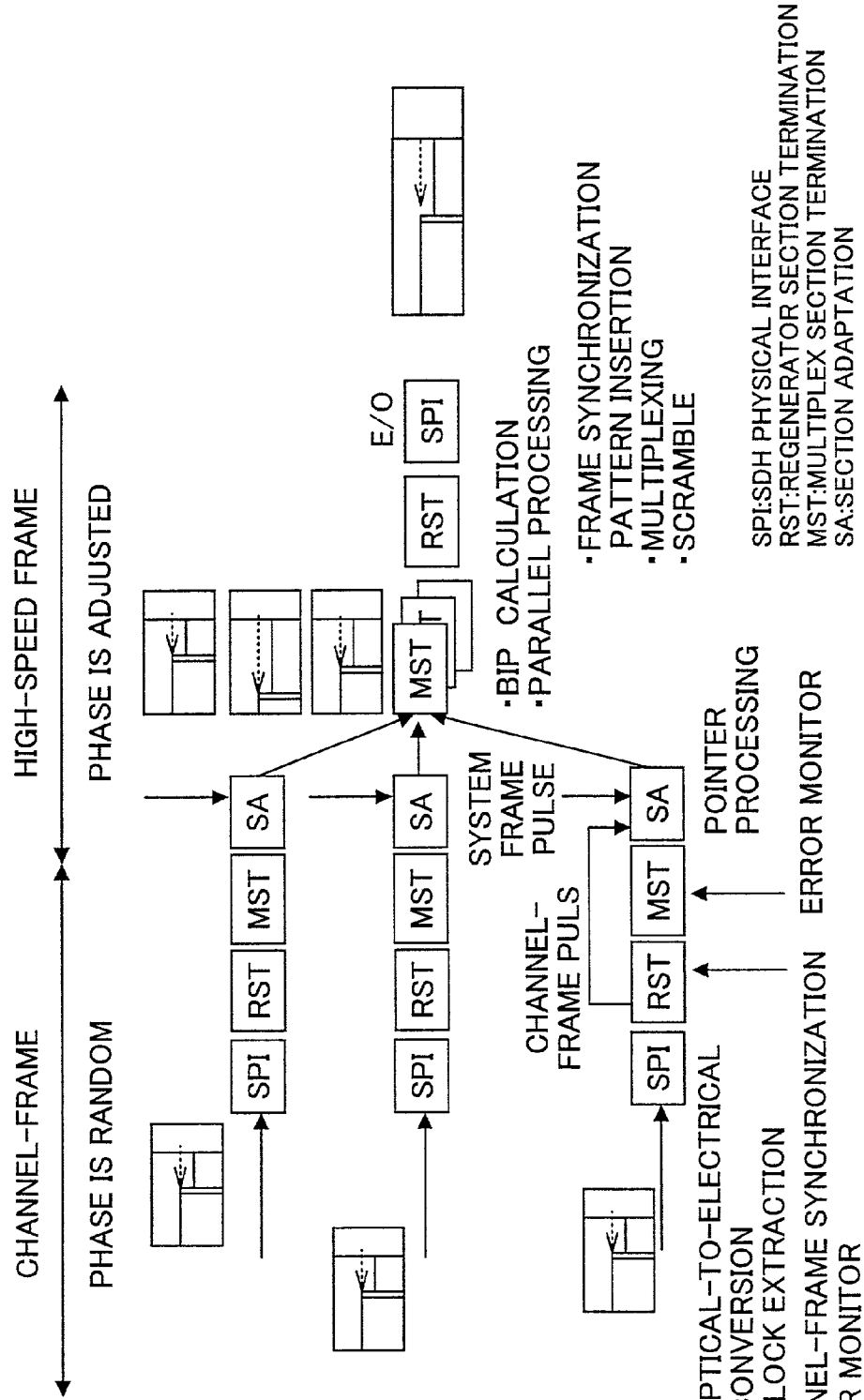

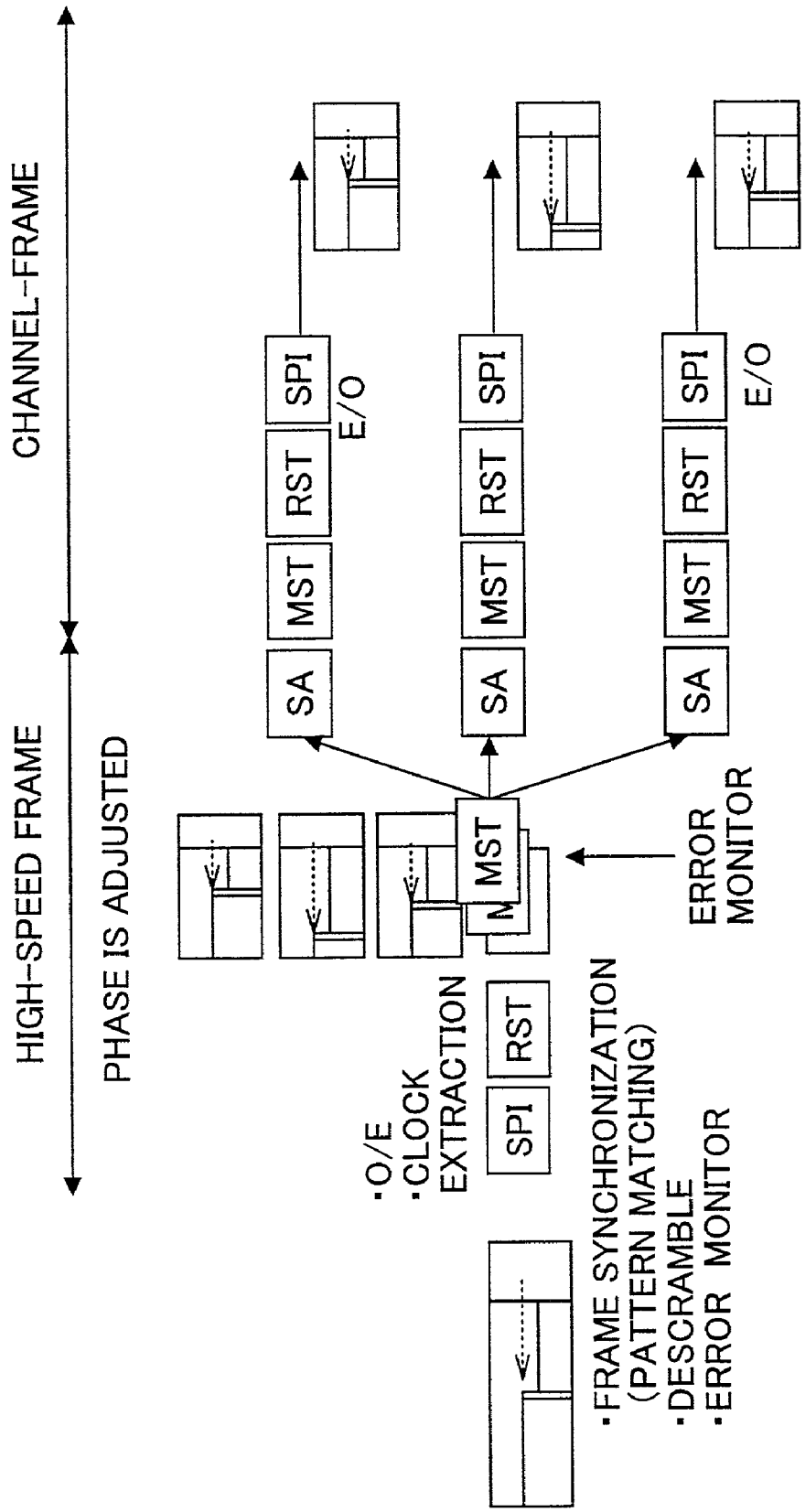

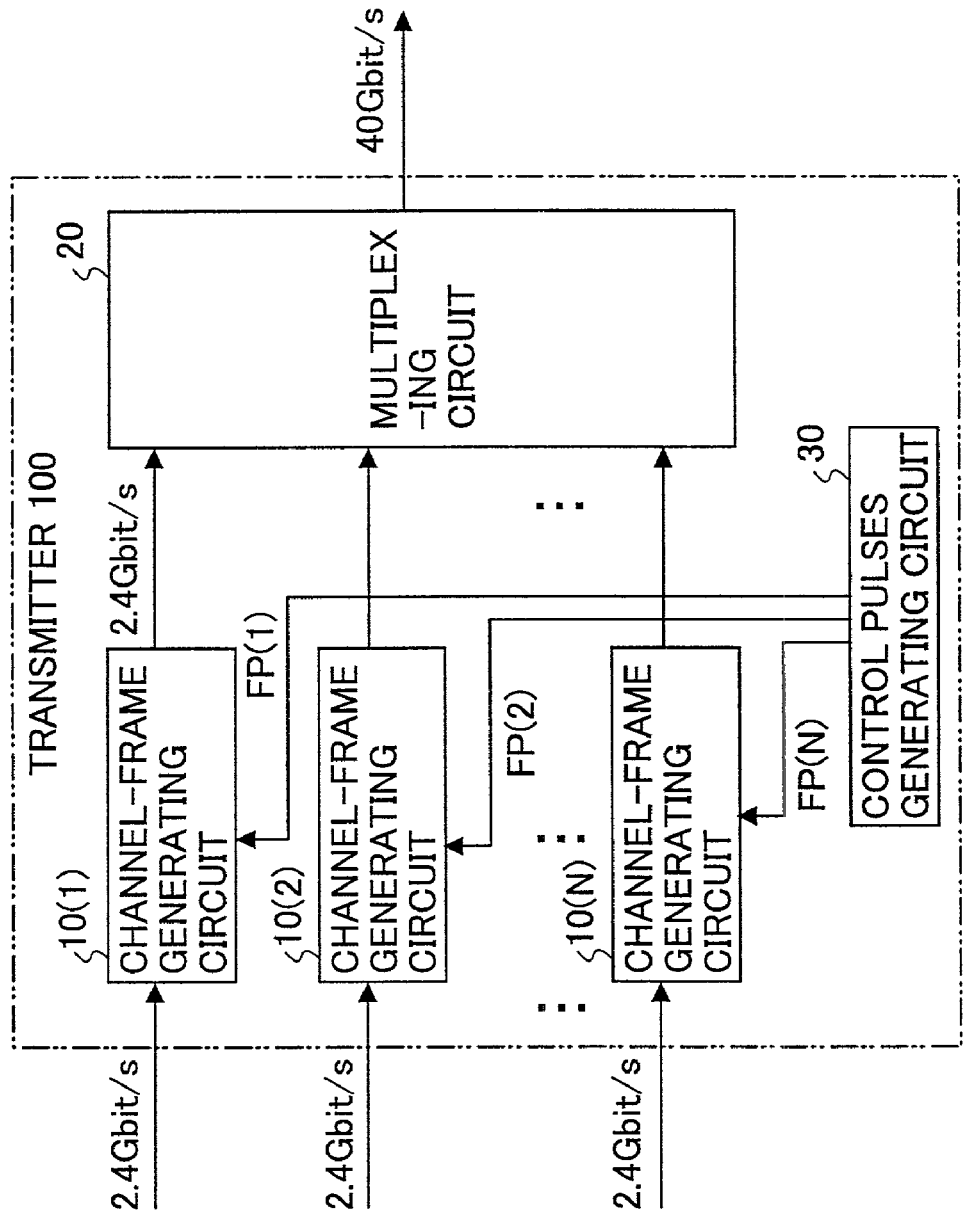

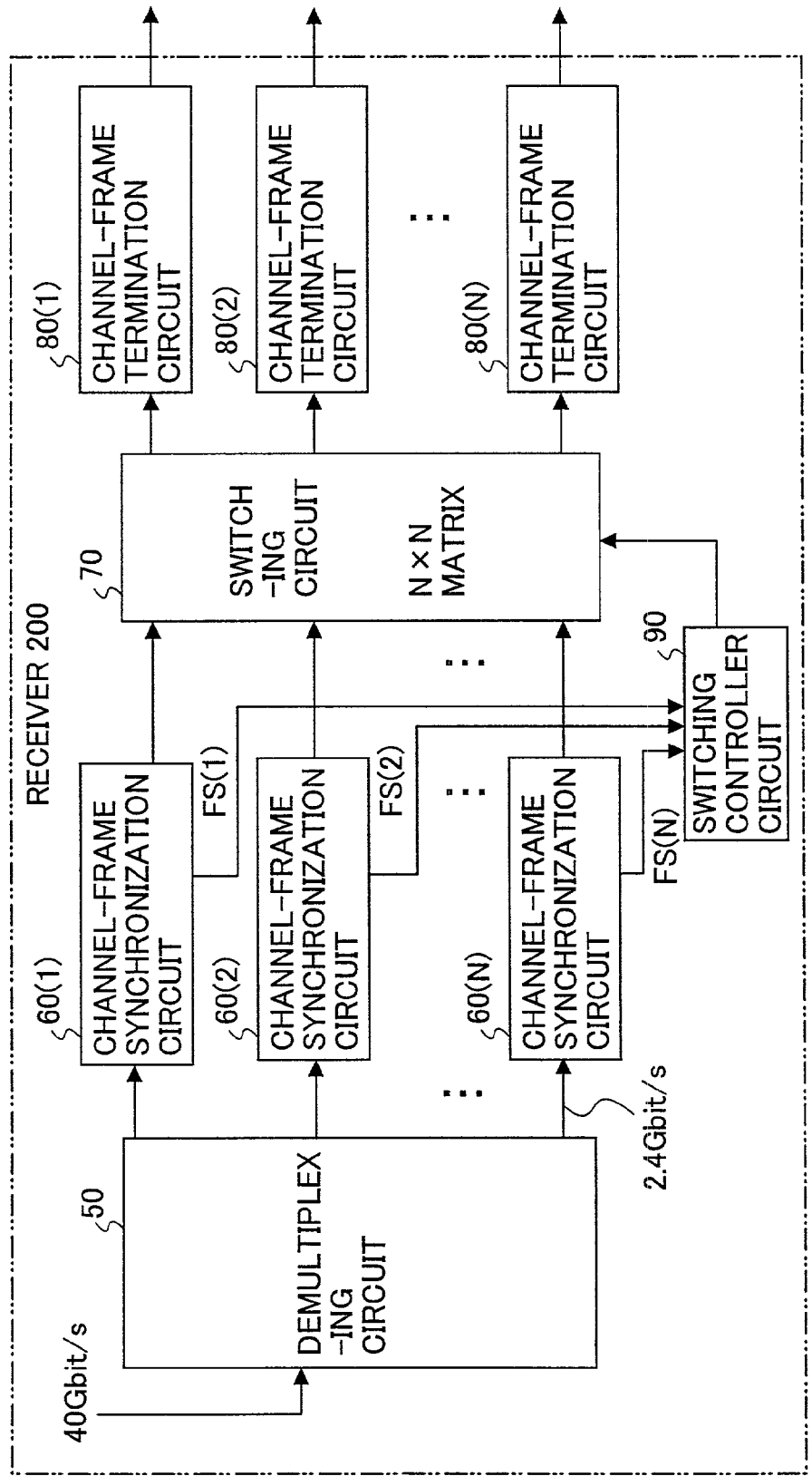

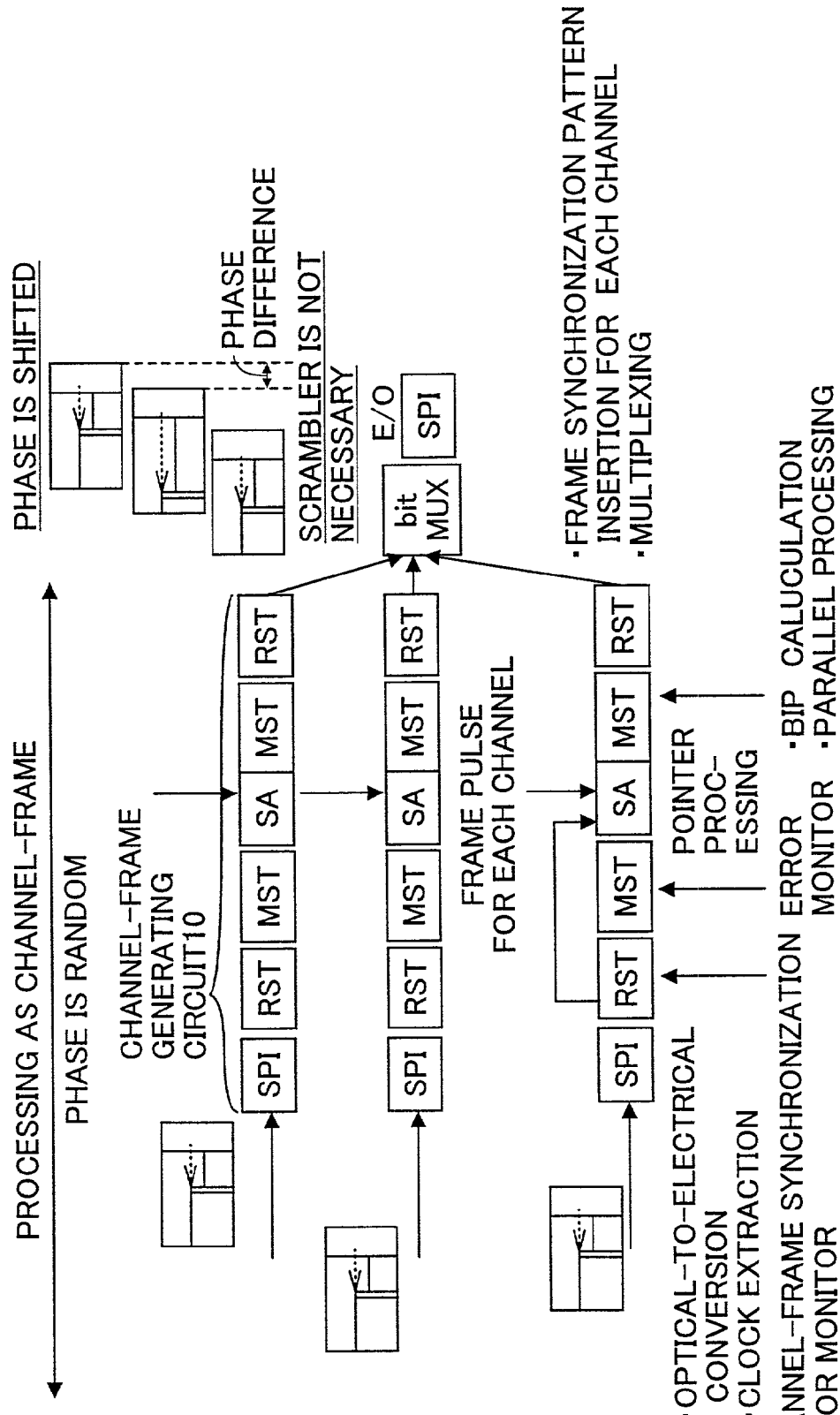

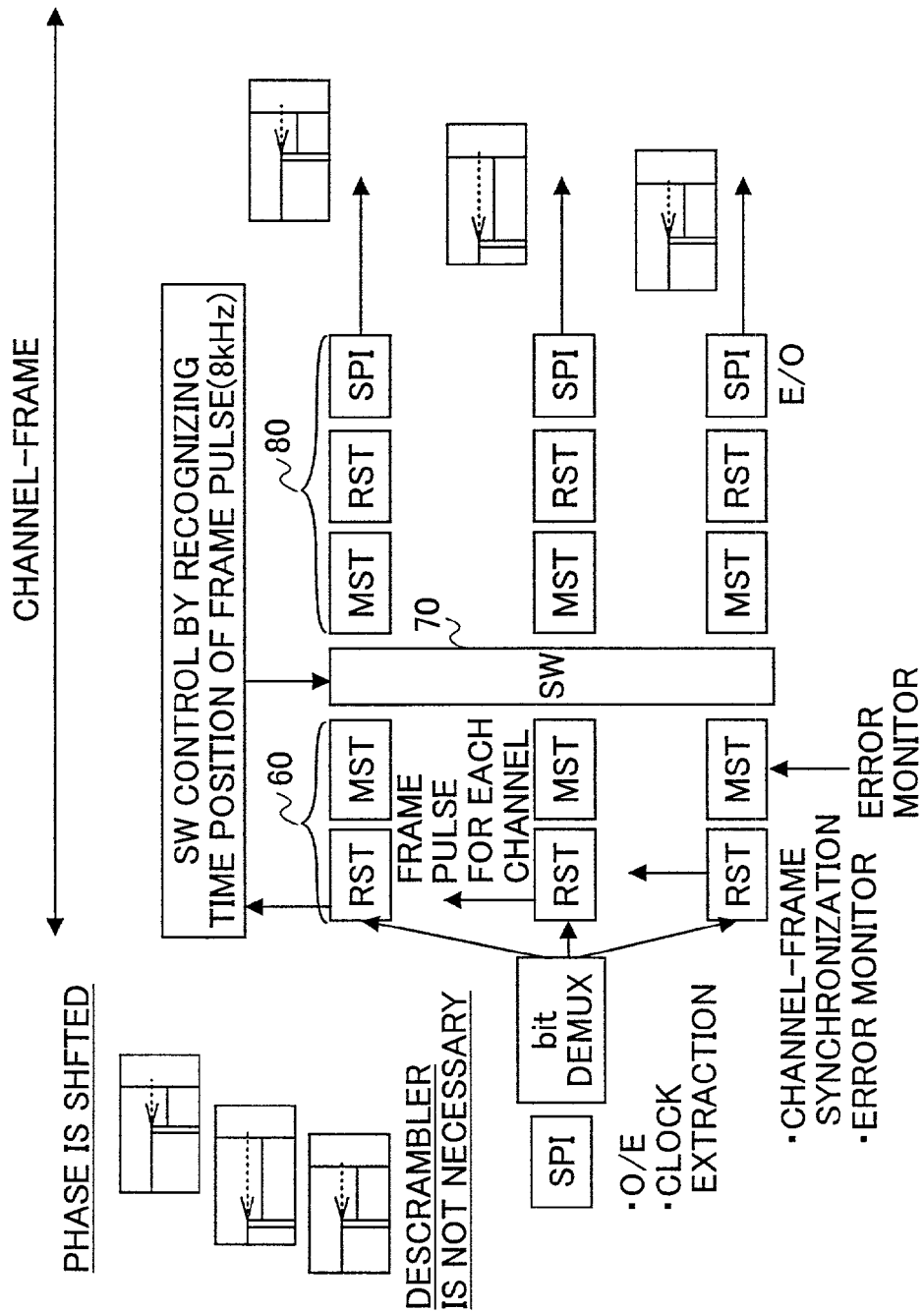

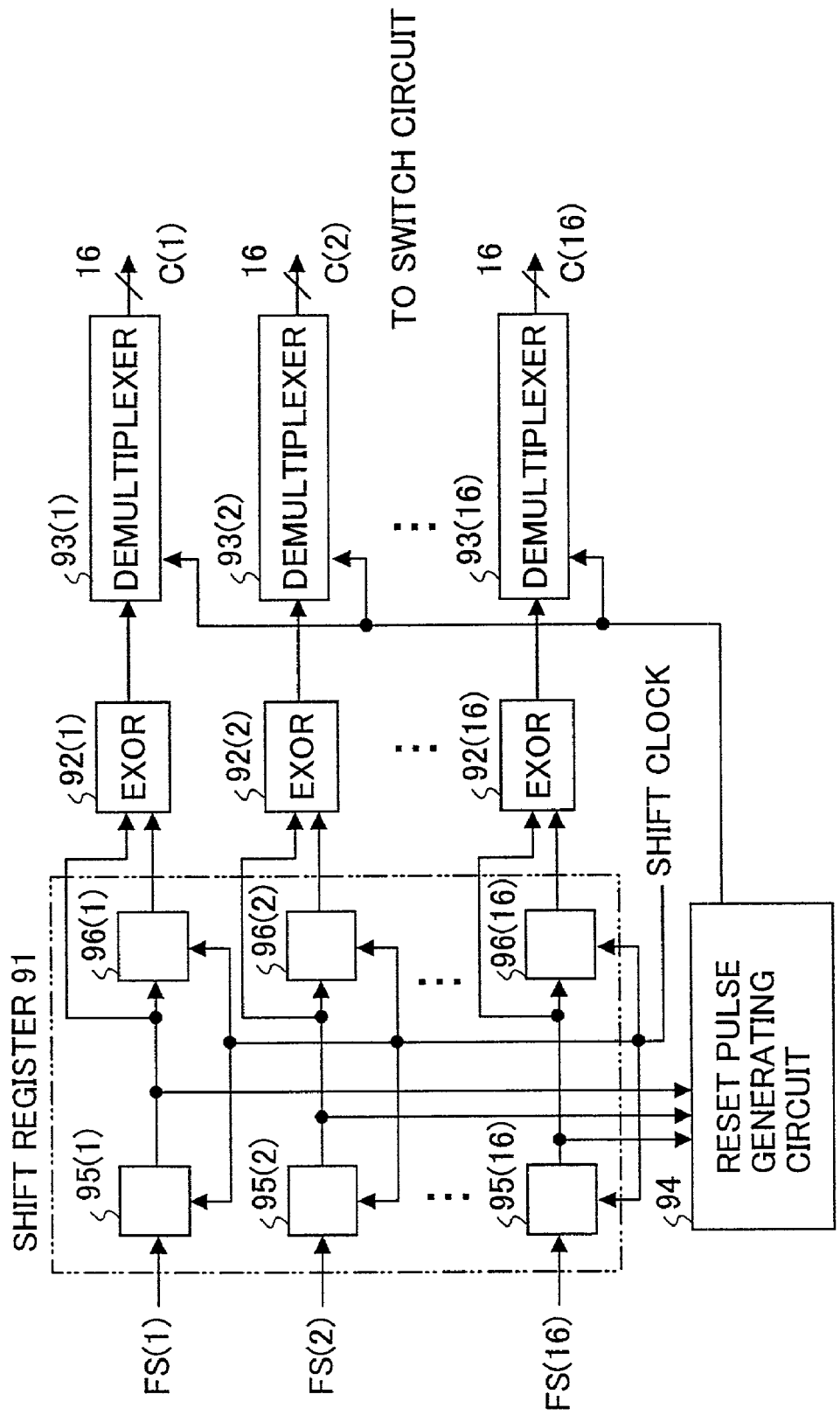

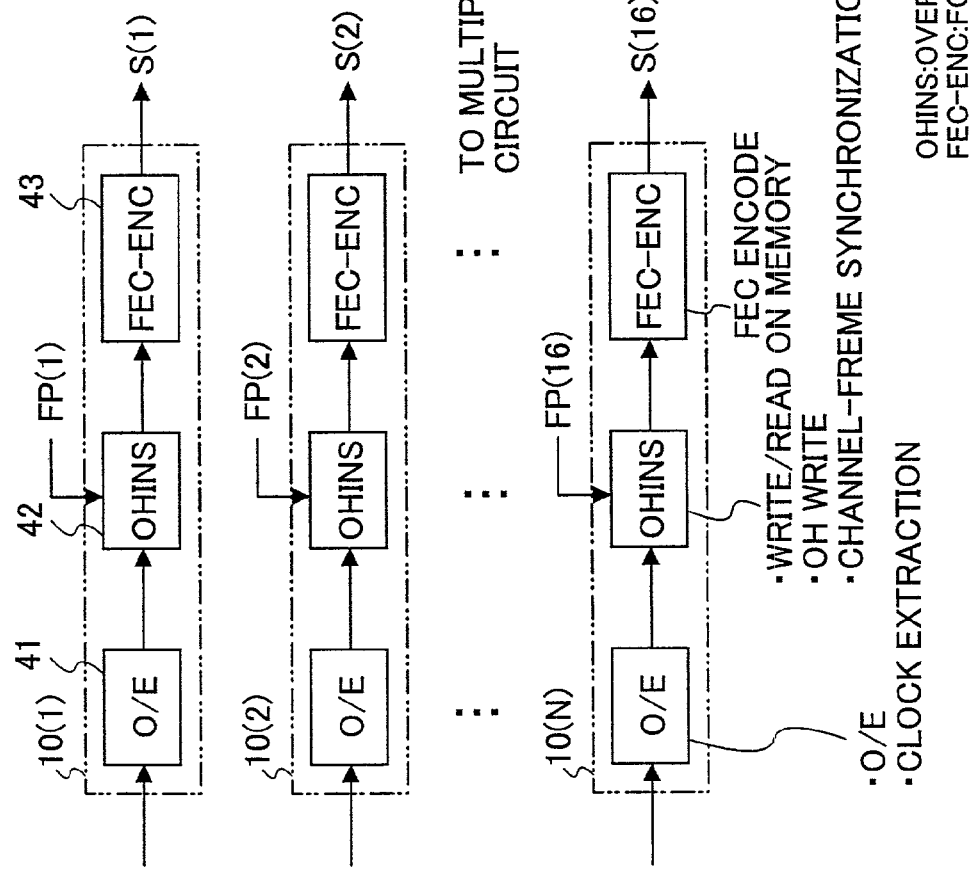

MULTIPLEXING AND TRANSMISSION APPARATUS

BACKGROUND OF THE INVENTION

1. Field of the Invention

The present invention relates to a multiplexing and transmission apparatus for transporting signals in the Time Division Multiplexing (TDM) regime. In particular, the present invention relates to a very high—speed multiplexing and transmission apparatus beyond 10 Gbit/s.

This application is based on patent application number 2000-180928 filed in Japan, the contents of which are incorporated herein by reference.

2. Description of the Related Art

Given the rapid increase of data traffic demand, as can be seen in the well-known situation of the Internet, transmission systems have to provide transmission capacities of the order of Tera bit/s in the near future. To satisfy the huge demand, combined use of Wavelength Division Multiplexing (WDM) and Time Division Multiplexing (TDM) is indispensable because this combination effectively uses fiber bandwidth. Here we focus on TDM technology for the next generation systems.

In the Time Division Multiplexing (TDM) regime, where low speed signals are multiplexed into a high-speed data stream, the traditional approach is to configure a new high-speed digital frame in the transmitter side. FIG. 1 shows an operation example in an Synchronous Digital Hierarchy (SDH) multiplexing apparatus (transmitter). As shown in this figure, frame phase is adjusted when configuring the new high-speed digital frame.

In the receiver side, after detecting the high-speed frame's start position (which is called delimiter) by pattern matching, each channel is identified from its assigned time-position relative to the frame's start position. This operation is shown in FIG. 2 taking the receiver side of the SDH multiplexing apparatus as an example.

The channel identifier of TDM is not manifested on each channel, unlike Wavelength Division Multiplexing (WDM) where the channel identifier is the wavelength of each optical channel, or unlike Asynchronous Transfer Mode (ATM) where the channel identifier is directly written into the VPI (Virtual Path Identifier) field defined in the cell header.

As one example of a TDM application, 10 Gbit/s transmission systems use the Synchronous Digital Hierarchy (SDH) format as shown in FIGS. 1 and 2, more exactly the STM-64 frame specified as the international standard in ITU-T G.707. The receiver detects the start position of the STM-64 frame by special pattern matching at high-speed data rate, and after that each channel is demultiplexed into appropriate tributary port by controlling the demultiplexing circuit: e.g., the byte right after the framing byte is recognized as channel 1, the next byte is for channel 2, and so on. It is common to call the detection of the frame start position as frame synchronization, and, the processing of the frame synchronization for a high-speed serial frame often requires the clock speed to be lowered by serial to parallel conversion. In general, increasing the number of parallel lines results in complex and large-scale circuits. The conventional approach to frame synchronization leads to the following problem.

When the bit rate exceeds 10 Gbit/s, for example 40 Gbit/s, the clock speed is close to the limit of electronic circuits. This complicates the realization of the intelligent processing operations needed such as pattern matching and demultiplexing circuit control required. For a 10 Gbit/s system, frame synchronization is executed at the clock rate of 1.25 GHz or 622 MHz after serial-parallel conversion where the parallel number is usually 8 or 16. Frame synchronization processing in 10 Gbit/s systems is difficult to achieve, even if we use compound semiconductors with large speed margins.

If we use the similar parallel number for frame synchronization in 40 Gbit/s systems, the processing clock rate should be 5 GHz or 2.5 GHz and the intelligent pattern matching processing involved would demand excessive circuit development cost. If we want clock rates of 1.25 GHz or 622 MHz, the parallel number should be 32 or 64, which leads to very complex and large-scale circuits. Moreover, the demultiplexing circuit for a 40 Gbit/s system would consist of several chips, e.g., 1:16 demultiplexer consisting of 1:2 demux, two 1:2 demux and four 1:4 demux. This is because a completely integrated 1:16 demultiplexer is not practical at the clock rate of 40 Gbit/s. The reason to use several chips is that high clock rate devices tend to support only very simple functions, on the other hand, devices suitable for integration operate at low clock rates. Controlling such multi-chip configurations is not practical, because each device has a different interface and timing margin.

For the line rate of 40 Gbit/s, two frame synchronization functions have been standardized: the conventional scheme for SDH in G.707 and that for the Optical channel Transport Unit (OUT)3 (part of the Optical Transport Network (OTN)) in ITU-T G.709. Apparatuses that comply with these international standards is not available today and will be expensive for several years after its introduction.

When we consider even higher data rates, for example 100 Gbit/s, we must accept that electronic circuits will have to be replaced by optical circuits as demultiplexers. In that case, conventional frame synchronization is not feasible, because optical circuits are limited to very simple functions.

A recent trend is to use the SDH interface in various new ways since the cost-effectiveness of hundred-Mbit/s-class SDH interfaces is very attractive to end-users. Thus, an increasing number of manufacturers are configuring their own sub-networks around SDH functionality. They often use the Section Overhead (SOH) for their own purposes and do not worry about complying with standard specifications. Therefore, network carriers that support those sub-networks are required not to terminate the proprietary SOH of users. Therefore, transparency of client overhead is a key requirement for today's transmission equipment.

SUMMARY OF THE INVENTION

It is an objective of the present invention to provide an economical multiplexing and transmission apparatus for very high-speed networks, especially reducing the complexity and development cost for the frame synchronization function.

It is also an objective of the present invention to provide an intermediate solution for frame synchronization function until an apparatus that fully complies with the standard becomes available at reasonable cost.

In addition, it is also an objective of the present invention to provide an economical scrambler function for very high-speed multiplexing transmission systems.

Further, it is also an objective of the present invention to support the realization of client-transparent multiplexing and transmission systems.

It should be noted that when such apparatus becomes available, the next generation of ultra high-speed systems should be under consideration for installation, where the present invention will allow the realization of feasible ultra high-speed systems at reasonable cost.

The above objectives are achieved in the present invention by a multiplexing and transmission apparatus which receives low-speed frame signals from a plurality of channels in parallel and outputs a high-speed serial signal, the multiplexing and transmission apparatus including:

a control pulses generating circuit which generates control pulses each of which corresponds to one of the channels, wherein phases of the control pulses are different for each channel;

channel-frame generating circuits, connected to the control pulses generating circuit, each of which receives the low-speed frame signal and outputs the low-speed frame signal in synchronization with the control pulse; and a multiplexing circuit, connected to the channel-frame generating circuits, which multiplexes the low-speed frame signals into the high-speed serial signal and outputs the high-speed serial signal.

The above objectives are also achieved in the present invention by a multiplexing and transmission apparatus which receives a high-speed serial signal, demultiplexes the high-speed serial signal into low-speed frame signals and outputs the low-speed frame signals to a plurality of channels in parallel, the multiplexing and transmission apparatus including:

a demultiplexer which demultiplexes the high-speed serial signal into the low-speed frame signals;

channel-frame synchronization circuits, connected to the demultiplexer, each of which receives the low-speed frame signal, generates a frame pulse corresponding to the low-speed frame signal, and outputs the low-speed frame signal;

a switching circuit, connected to the channel-frame synchronization circuits, which receives the low-speed frame signals and sends each of the low-speed frame signals to an appropriate port of the channel; and a switch controller circuit which controls the switching circuit according to the frame pulses output from the channel-frame synchronization circuits.

According to the above-mentioned invention, no high-speed frame is generated. A function equivalent to high-speed frame synchronization is partly achieved by re-using channel-frame synchronization. It is also partly achieved by the multiplexing and transmission apparatus in the following way.

In the multiplexing and transmission apparatus in the transmitter side, pulses generated from the control pulse generating circuit have different pulse timing. Since the channel-frame is generated based on the pulse timing, each channel has a different channel-frame phase. This eliminates the need to control a multiplexing circuit, e.g., set or reset operation, which is advantageous when designing very high-speed semiconductor multi-chip modules, or an optical multiplexing circuit.

In the multiplexing and transmission apparatus in the receiver side, after the demultiplexing circuit, each demultiplexed signal is subjected to channel-frame synchronization, regardless of channel number. For example, in a 16 channel multiplexing and transmission system, the no.4 channel-frame synchronization circuit may process channel no.16. Each channel-frame synchronization circuit generates frame pulses, each of which is different according to the channel. Recognizing the difference of frame pulse timing allows the channel to be identified e.g., the first pulse means channel no.1, and the last pulse means channel no.16. In the above example, demultiplexing port no.4 should be connected to tributary port no.16. Therefore, the switching circuit connects demultiplexed ports to appropriate tributary ports using control commands generated from the switch controller circuit. It should be also noted that there is no need to control a demultiplexing circuit (i.e. set or reset operation), which is advantageous for very high-speed compound semiconductor multi-chip modules or optical demultiplexing circuits.

In addition, according to the present invention, an economical scrambler function for very high-speed multiplexing transmission systems can be provided.

Such a scrambler is indispensable for certain digital systems that must guarantee clock recovery in service. However, conventional circuit implementation leads to high cost since very high-speed devices are needed to realize the intelligent functions demanded.

On the other hand, according to the present invention, the scrambler function is realized through its establishment of different channel-frame phase in each channel at the transmitter side. Consider the case of bit-multiplexing of channel-frames at the same channel-frame timing, as is used in some existing systems. The channel-frame has a fixed byte overhead. For instance, when using SDH for each channel, each channel carries an A1 byte (11110110) for channel-frame synchronization. In 16 channel multiplexing systems using the same channel-frame phase, a continuous 64 bit string of "1s" can cause failure of clock recovery when using Non-Return to Zero (NRZ) line coding. Therefore, such systems should use a scrambler or equivalent techniques, e.g., 8B10B coding. In the present invention, no two channel-frame phases are the same, so continuous patterns are rare and there is no possibility of continuous channel-frame overheads occurring in the multiplexed digital sequence.

According to the present invention which is described in this specification, the realization of client-transparent multiplexing and transmission systems can be supported by its employment of channel-frame formats that do not completely terminate client-specific overhead. One example of such a format is the Forward Error Correction (FEC) frame defined in ITU-T G.975. FEC channel-frame is generated independent of client signal format, so FEC channel-frame phase is independent of the client frame phase. Another example is to use the SDH frame format as channel-frame format, where client SOH is not fully terminated. In the latter example, the present invention makes it necessary to convert the channel-frame phase (given by client SDH frame phase) into the phase determined by the control pulse generating circuit in the transmitter of the multiplex and transmission system. In this process, pointer bytes have to be modified, which means that the parity check bytes have to be changed, thus, transparency is limited in this example. The FEC channel-frame is better than the SDH channel-frame in terms of transparency.

BRIEF DESCRIPTION OF THE DRAWINGS

Other objects, features and advantages of the present invention will become more apparent from the following detailed description when read in conjunction with the accompanying drawings, in which:

FIGS. 1 and 2 are diagrams for explaining conventional technology taking a SDH multiplexing apparatus as an example;

FIGS. 3A and 3B is a block diagram of a transmitter and a receiver of the present: invention;

FIG. 4 shows the operation of the transmitter;

FIG. 5 shows the operation of the receiver;

FIG. 14 is a block diagram of a switch controller circuit in Embodiment 1 of the present invention;

FIG. 16 is a block diagram of the channel-frame generating circuit in Embodiment 2 of the present invention;

DETAILED DESCRIPTION OF THE PREFERRED EMBODIMENTS

The following embodiments are provided for illustrative purposes and do not limit the interpretation of the claims, and the combination of all the features explained in the embodiments may not always be necessary for solving the problems that may arise in similar situations.

The present invention will be explained in the following with reference to the drawings. In all diagrams used to explain the invention, those parts having the same function are referenced using the same numerals, and their explanations are omitted.

Embodiment 1

Figure 6A:
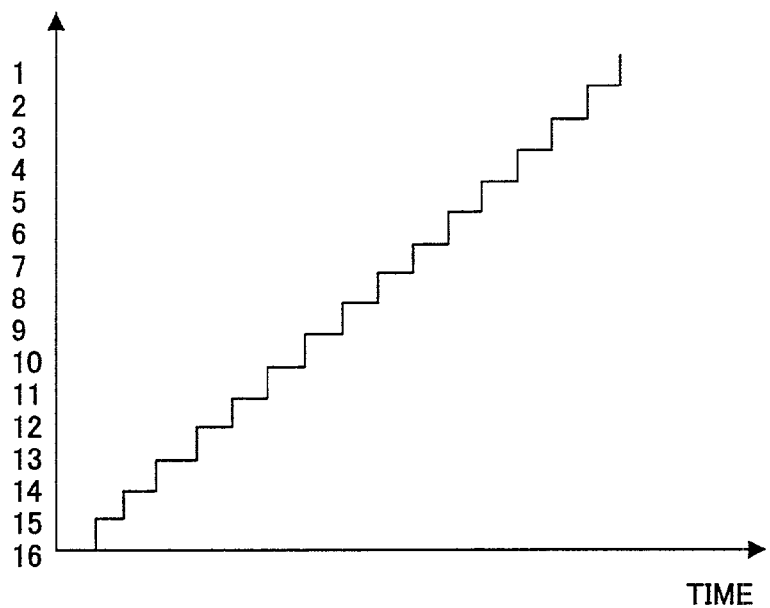
FIGS. 6A and 6B are for explaining how the channel number is identified in the receiver.
Figure 6B:
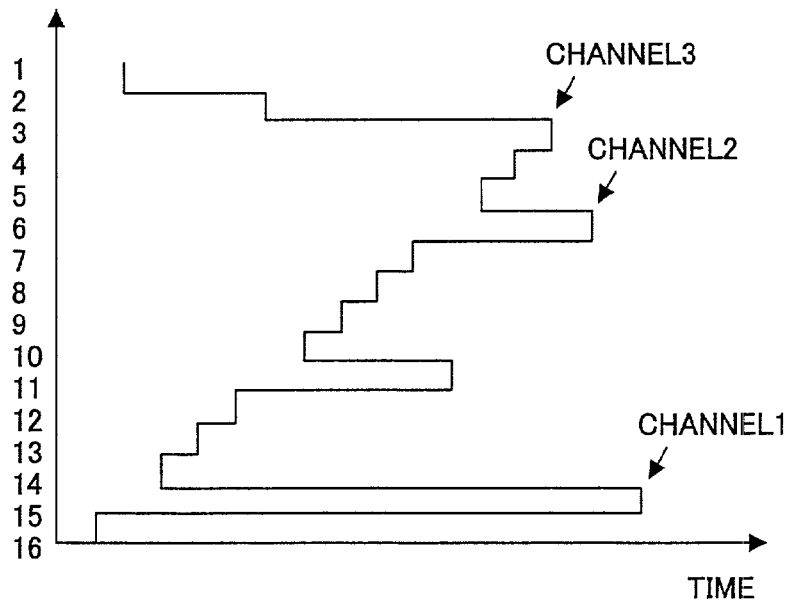
Figure 7:
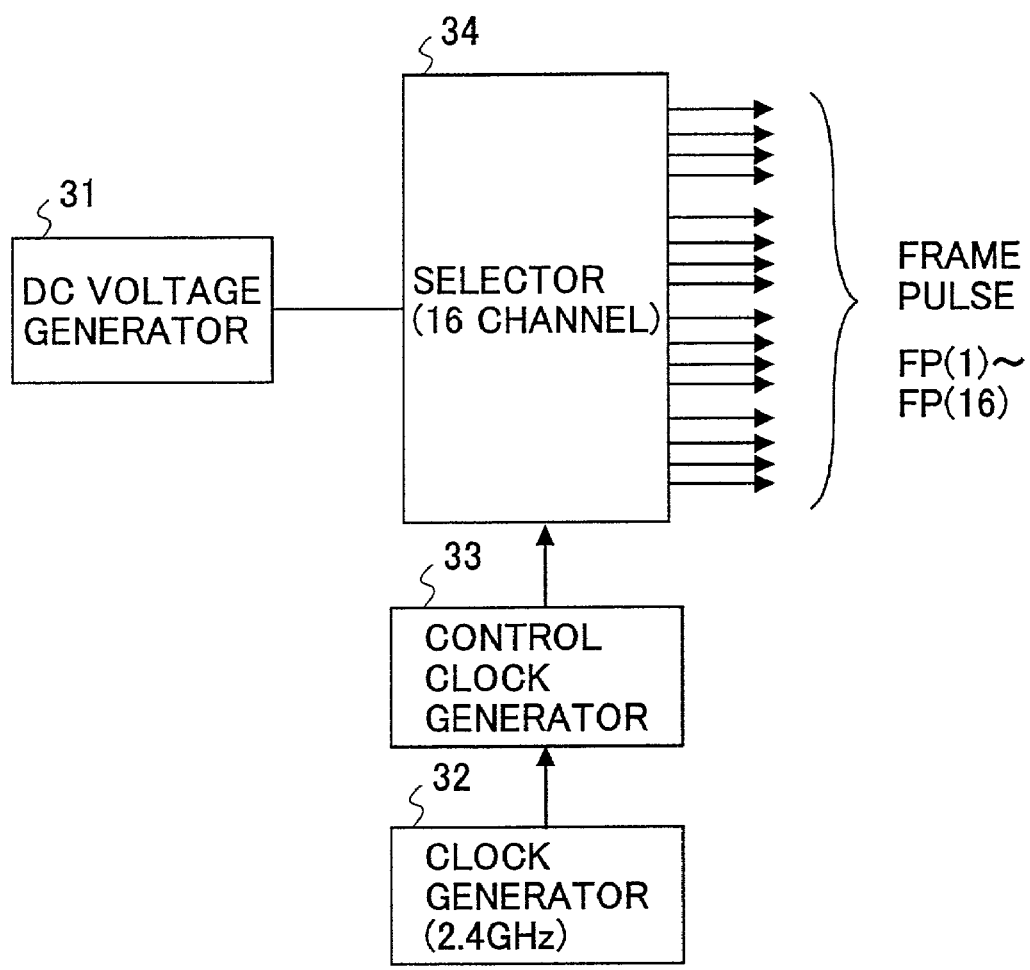
FIG. 7 is a block diagram of a control pulse generating circuit in Embodiment 1 of the present invention.
Figure 8:
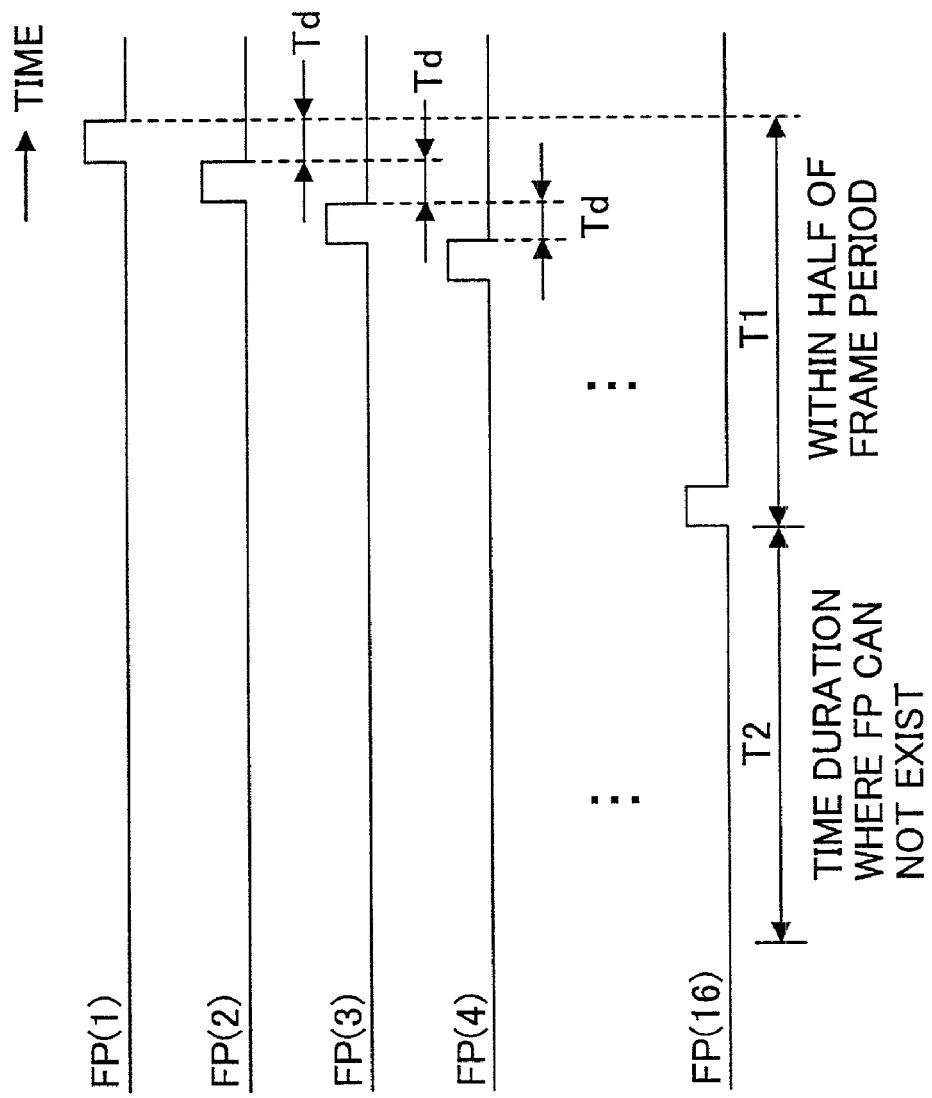
FIG. 8 is a schematic diagram of control pulses generated by the control pulse generating circuit in Embodiment 1 of the present invention.
Figure 9:
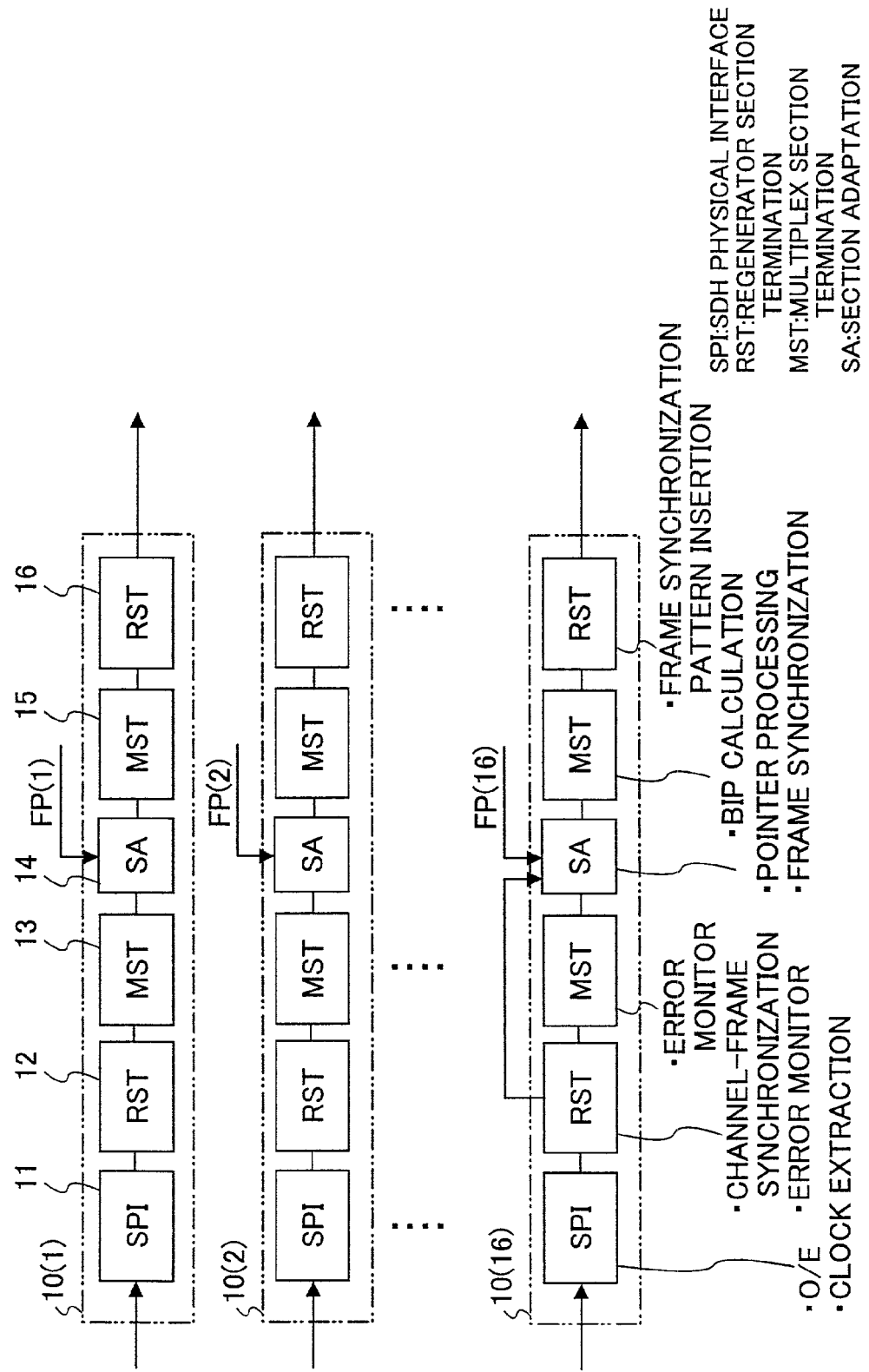
FIG. 9 is a block diagram of a channel-frame generating circuit in Embodiment 1 of the present invention.
Figure 10:
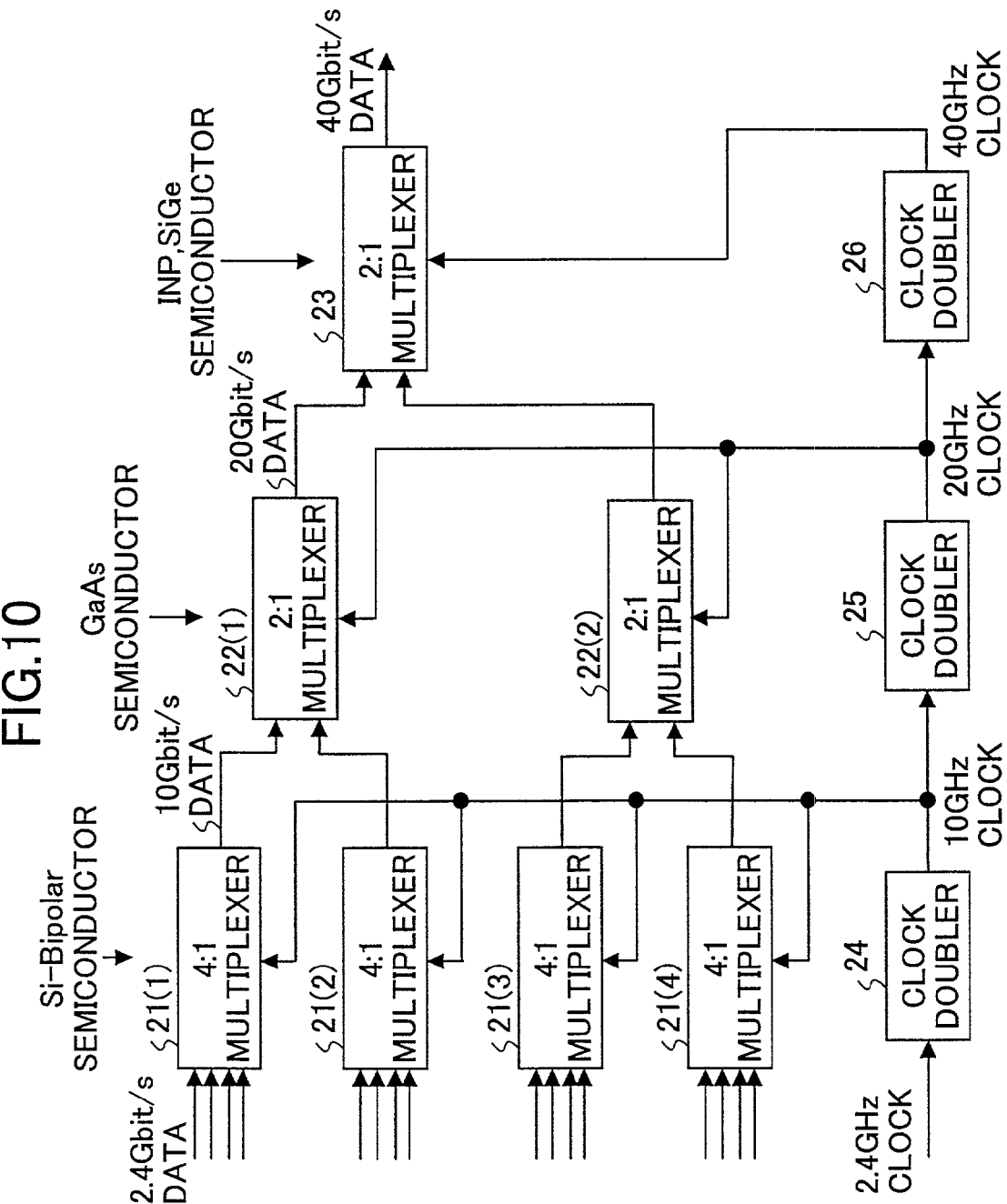
FIG. 10 is a block diagram of a multiplexing circuit employed in Embodiment 1 of the present invention.
Figure 11:
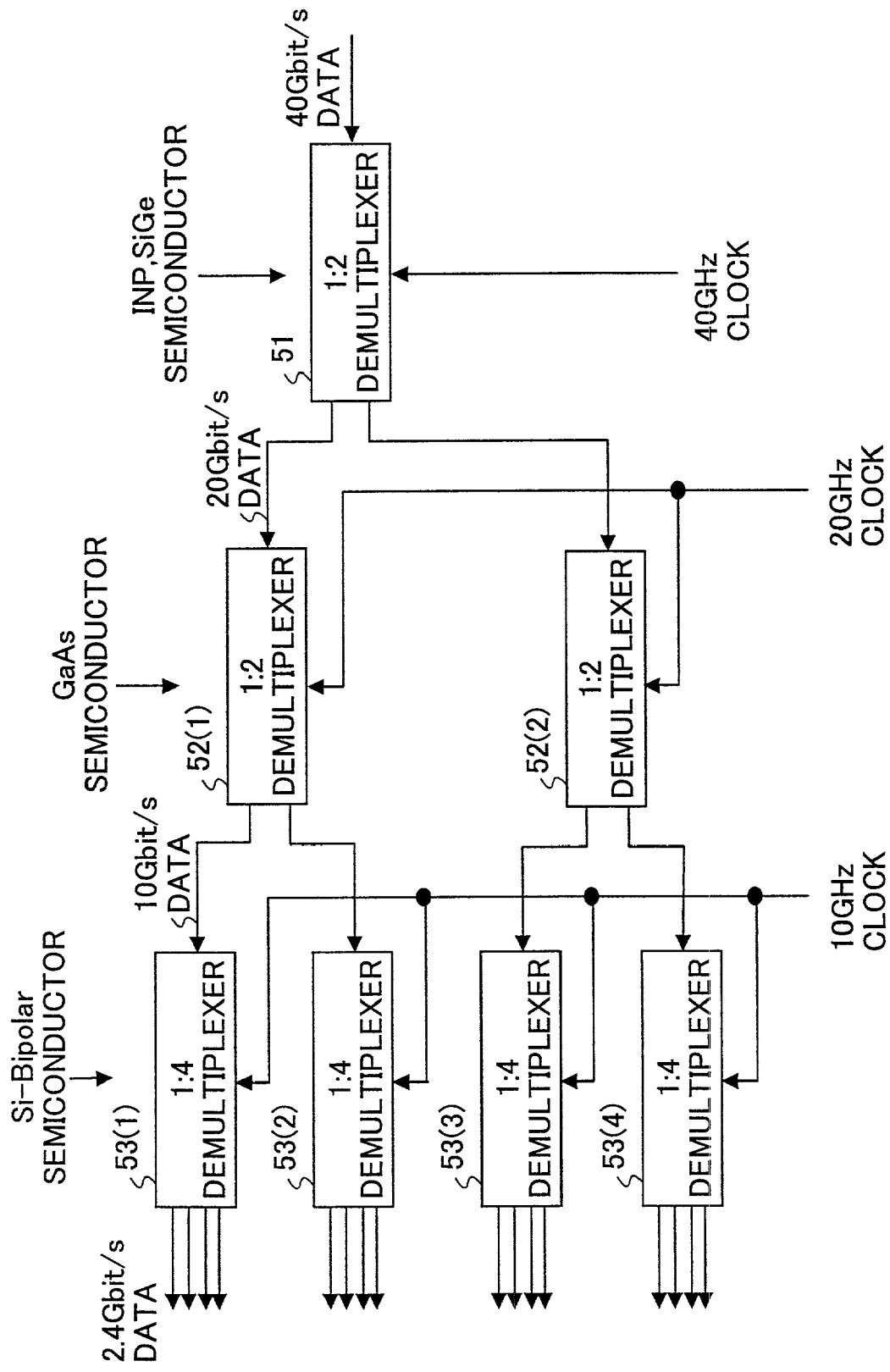
FIG. 11 is a block diagram of a demultiplexing circuit employed in Embodiment 1 of the present invention.
Figure 12:
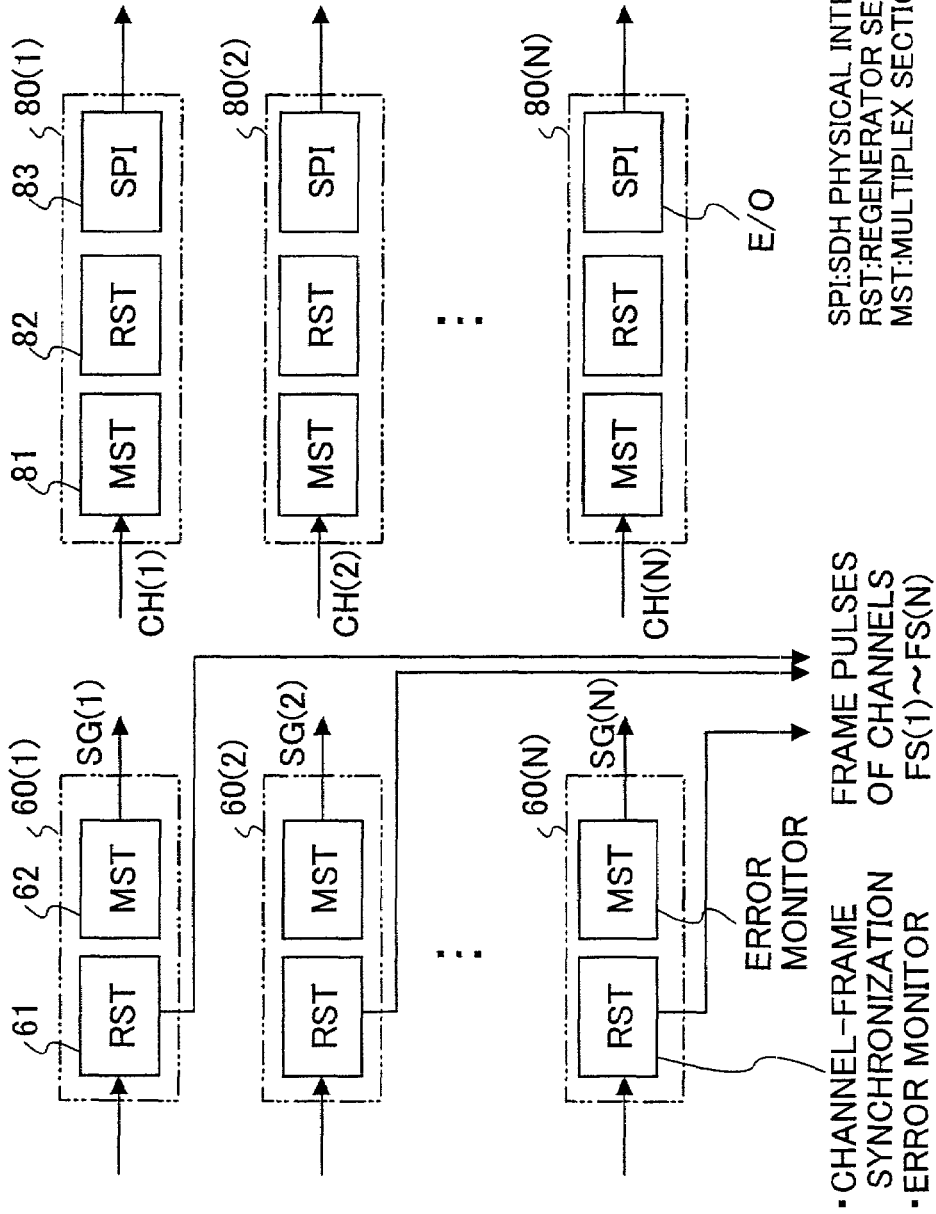
FIG. 12 is a block diagram of channel-frame synchronization and termination circuits in Embodiment 1 of the present invention.
Figure 13:
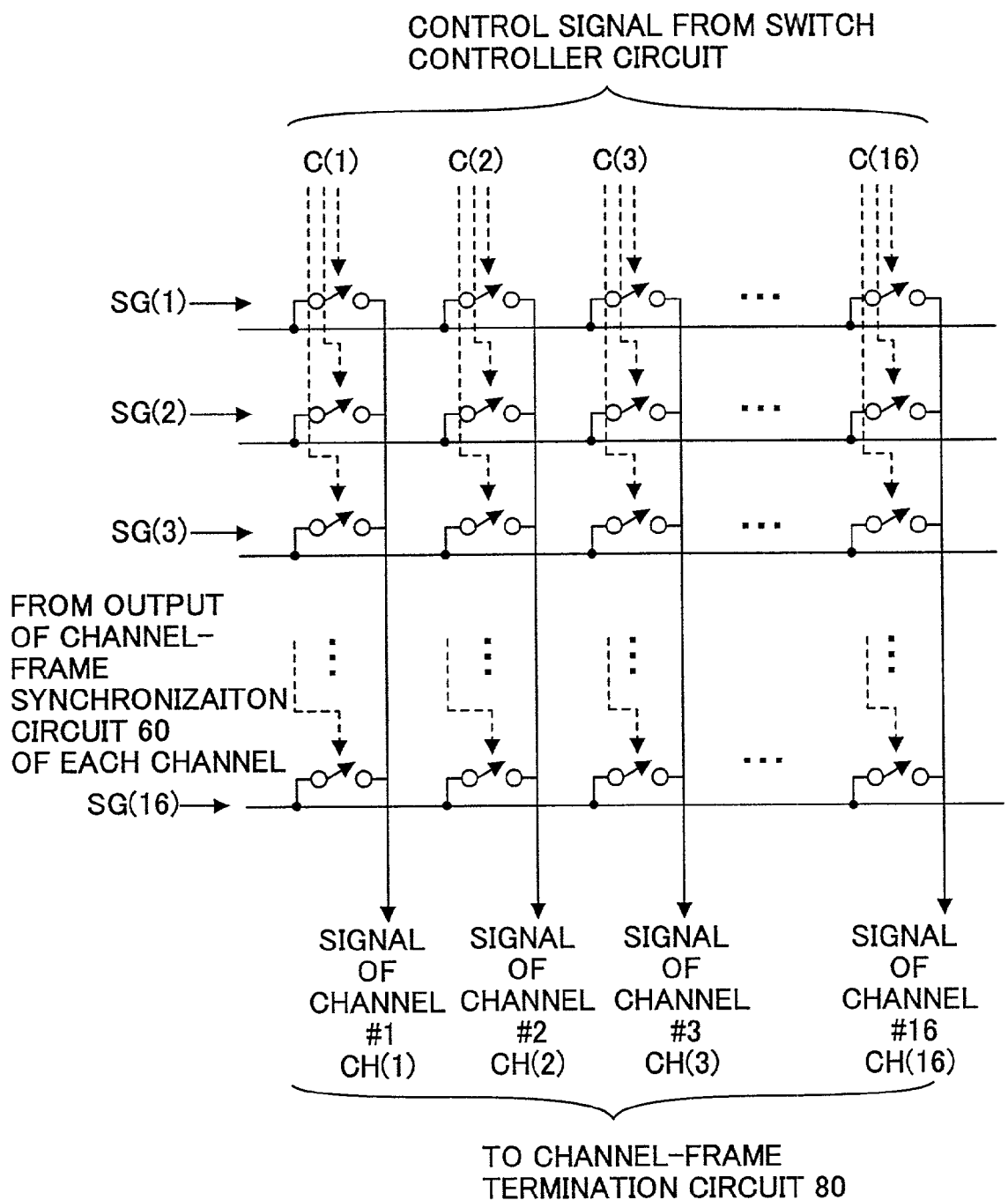
FIG. 13 is a block diagram of the switching circuit in Embodiment 1 of the present invention.
Figure 15A:
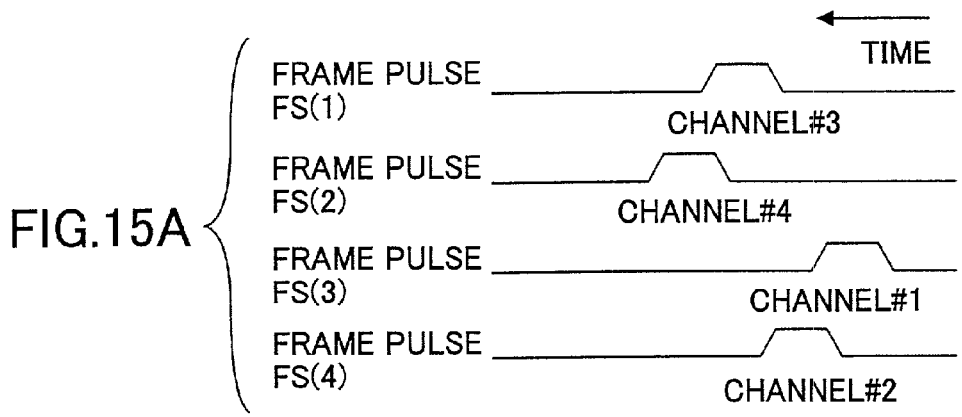
FIGS. 15A–15C are schematic diagrams that provide operation details of the switch controller circuit in Embodiment 1 of the present invention.
Figure 15B:
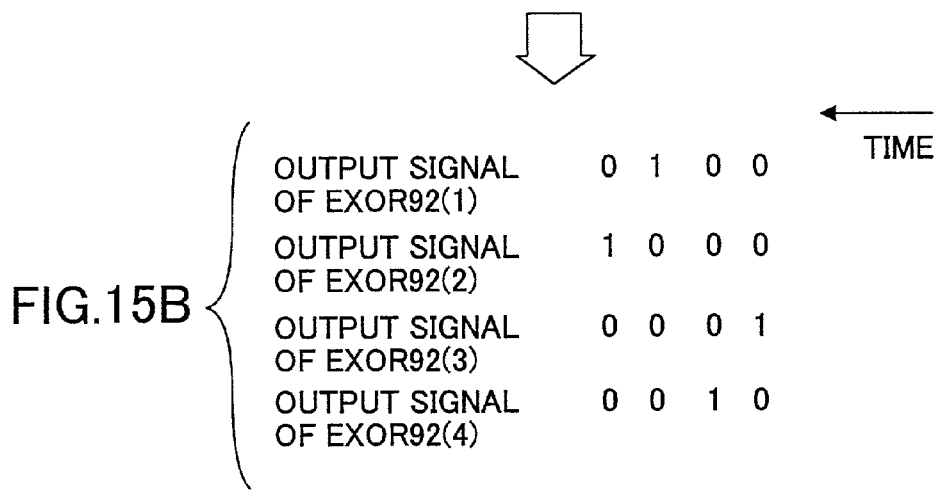
Figure 15C:
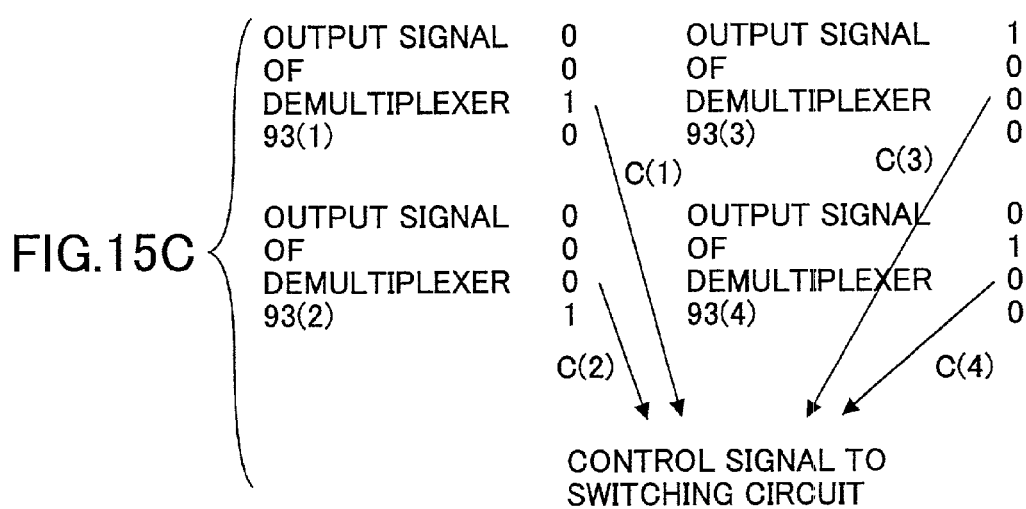

Embodiment 1 is explained using FIG. 3A to FIG. 15C. FIG. 3A shows a block diagram of a transmitter 100 and FIG. 3B shows a receiver 200 of the present invention. FIG. 4 shows the operation of the transmitter and FIG. 5 shows the operation of the receiver. FIGS. 6A and 6B are for explaining how the channel number is identified in the receiver. FIG. 7 shows a block diagram of a control pulses generating circuit 30. FIG. 8 shows an example of a time-chart of control pulse in each channel. FIG. 9 shows a block diagram representing a channel-frame generation circuit 10. FIG. 10 shows a block diagram of a multiplexing circuit 20. FIG. 11 shows a block diagram of a demultiplexing circuit 50. FIG. 12 shows a block diagram of a channel-frame synchronization circuit 60. FIG. 13 shows a configuration example of a switching circuit 70. FIG. 14 shows a block diagram of a switch controller circuit 90. FIGS. 15A–15C provide an example of the operation of the switch controller circuit 90.

The transmitter 100 shown in FIG. 3A outputs a high-speed digital signal after multiplexing parallel low speed signals each of which has a certain digital frame format (hereafter we call it the channel-frame format). In detail, we can use international standard STM (Synchronous Transport Module) frame in ITU-T recommendation G.707 or FEC frame in ITU-T recommendation G.975 as the channel-frame format. As shown in the figure, 16 parallel signals, each of which signals has 2.4 Gbit/s data rate, are multiplexed to yield 40 Gbit/s data rate. The high-speed signal is transmitted after electrical to optical conversion.

The transmitter in FIG. 3A has channel-frame generating circuits 10 (each of which operates on a different channel), the control pulse generating circuit 30, and the multiplexing circuit 20.

For example, when using the STM frame as the channel-frame format, the channel-frame generating circuit 10 executes a part of the SDH processing operations. In addition, when using the G.975 frame as the channel-frame format, the channel-frame generating circuit 10 executes a part of processing operations of the FEC. Therefore, there is no need to develop a special channel-frame generating circuit.

FIG. 4 shows the operation of the transmitter 100. As shown in FIG. 4, the channel-frame generating circuit 10 uses pulses from the control pulse generating circuit 30 in order to generate channel-frame on each channel. The pulses are used to control phases of the channel-frames. It should be noted that pulse timing operated on each channel-frame generating circuit 10 is intentionally different: FP(1), FP(2), and FP(N) shown in FIG. 3A have different timing. The channel signals are inserted into multiplexing circuit 20 by keeping this timing difference. The configuration of the channel-frame generating circuit 10 shown in FIG. 4 will be described later.

On the other hand, the receiver 200 shown in FIG. 3B executes demultiplexing usually after optical to electrical conversion, then transmits low speed parallel signals: e.g., 16 parallel 2.4 Gbit/s signals in the above example.

The receiver 200 depicted in FIG. 3A includes a demultiplexing circuit 50, a channel-frame synchronization circuit 60, a switching circuit 70, a channel-frame termination circuit 80, and a switching controller circuit 90. The channel-frame synchronization circuit 60 and the channel-frame termination circuit 80 are deployed on each channel independently.

A high-speed serial signal received at the receiver 200 is demultiplexed and parallel signals traverse the channel-frame synchronization circuits 60 and the switching circuit 70 and the channel-frame termination circuits 80.

In the receiver shown in FIG. 3B, frame synchronization is performed only on a per-channel basis, not on a high-speed frame basis. Frame synchronization after the demultiplexer is not parallel processing of high-speed frames, and is independent of each demultiplexed branch. Moreover, there is no control of the high-speed demultiplexing circuit 50. Therefore, we cannot tell which channel is processed at a certain channel-frame synchronization circuit 60; it depends on the start up condition of the apparatus. This is why we need the switching circuit 70, which connects each demultiplexed port to an appropriate tributary port.

As shown in FIGS. 3A and 5, each channel-frame synchronization circuit 60 generates a frame pulse synchronized to the received channel-frame start position, FS(1), FS(2), and FS(N), where N is the number of channels of the multiplexing and transmission system. The switch controller circuit 90 first detects which tributary port should be connected to which channel-frame synchronization circuit 60, then the switching circuit 70 makes the appropriate connections.

FIGS. 6A and 6B shows how the channel number is identified in the receiver side. In this example, the control pulse (FP) is provided to each channel-frame in the transmitter side as shown in FIG. 6A. For example, when the channel-frame synchronization circuit 60 corresponding to the DMX output port 15 detects a frame pulse which has earliest timing as shown in FIG. 6B, the channel-frame is identified as channel 1 in the receiver and the channel-frame is switched to a port of the channel 1. In the same way, the channels are identified by checking the timing of the frame pulses.

Hereafter, details of operations of the transmitter 100 are explained. As shown in FIG. 7, the control pulse generating circuit 30 in the transmitter 100 includes (in this example) a DC voltage generator 31, a clock generator 32, a control clock generator 33, and a selector 34.

The selector 34 is operated by control clock, provided by the control clock generator 33, which is lower than and synchronized to system clock (e.g., 2.4 GHz); it changes voltage-port time after time according to the control clock (non-zero voltage is supplied from the DC voltage generator 31).

The selector 34 has 16 output ports, and control pulse appears at different timing on each output port in accordance with control clock received from the control clock generator 33. Time difference of control pulses between adjacent channels is Td as depicted in FIG. 8. Moreover, time duration on which control pulses can be generated for every channel is limited to T1, which is smaller than one half of the time duration of channel-frame format. Thus, no pulses are generated outside T1 period. This empty period (outside T1, that is, T2) delimits the time-position of frame pulses in the channels. Without this delimiter, we can not tell which is the first frame pulse.

The channel-frame generating circuit 10 is illustrated in FIG. 9, where (in this example) STM frame is assumed to be the channel-frame. With reference to FIG. 9, the channel-frame generating circuit 10 includes an SDH physical interface (SPI) 11, a regenerator section termination (RST) 12, a multiplex section termination (MST) 13, a multiplex section adaptation (MSA) 14, and again a multiplex section termination (MST) 15, a regenerator section termination (RST) 16.

The SPI 11 executes optical to electrical conversion and vice versa, and also clock data recovery. The RST 12 usually includes RSOH (Regenerator Section Overhead) termination function, but in this embodiment, the RST 12 in FIG. 9 hosts only channel-frame synchronization (A1 and A2 bytes), and performance monitoring (PM) using B1 byte defined in RSOH, where other bytes are preserved for client transparency purposes. The MST 13 executes only PM on B2 byte; other bytes are preserved.

When using STM format as the channel-frame, we have to consider that low-speed tributaries are also STM frame signals. A tributary STM frame has arbitrary frame phase. In order to synchronize channel-STM-frame to the control pulse, there is a need to shift STM frame phase. This is done in the MSA 14 using pointer processing, wherein payload start position written in pointer bytes is changed relative to channel-STM-frame phase. The MST 15 executes B2 byte calculation in the context of Bit Interleaved Parity (BIP) with changed value of pointer bytes. Also RST 16 recalculates B1 byte. The low-speed frames input to the channel-frame generating circuit 10 and output from it are shown in FIG. 4 for example. The low-speed frames output from the channel-frame generating circuit 10 have phase difference each other corresponding to that of the control pulses.

The multiplexing circuit 20 includes several multiplexers 21, 22, 23 and clock doublers in the 40 Gbit/s example shown in FIG. 10. The first multiplexer 21 is for 4 to 1; from 2.4 G input to 10 G serial output. The second multiplexer 22 is for 2 to 1; from two input of 10 Gbit/s to serial 20 Gbit/s. The third multiplexer 23 is for 2 to 1; from two 20 Gbit/s parallel signals to a serial 40 Gbit/s signal.

Each multiplexer has different and high-speed clock rate, 10 Gbit/s, 20 Gbit/s, and 40 Gbit/s, so usual optimum devices can be selected to realize these three types of multiplexers. For 2.4–10 G mux, Si-bipolar or GaAs semiconductor will be selected. For 10 G–20 G mux, we may select GaAs or SiGe devices. For 20 G–40 G mux, InP or SiGe devices will be selected. FIG. 9 shows an example for performing bit-interleaving, but byte-interleaving Ls also applicable.

After multiplexing circuit 20, a serial signal is converted into an optical signal, which is not shown in FIG. 9. It should be noted there is no scrambler circuit, which is usually employed in conventional digital systems.

Next, details of operations of the receiver 200 are described. The demultiplexing circuit 50 in the receiver 200 shown in FIG. 3B includes three types of demultiplexer as is depicted in FIG. 11, where multiplexer has matching configuration with that shown in FIG. 10. The important point is that it is difficult to control precisely, set or reset control for a large group of multi-chip semiconductors made by different processes. FIG. 11 does not illustrate optical receiver. There is no descrambler. No frame synchronization circuit for high-speed frame is provided, unlike the usual systems, which need high-speed frame synchronization after the demultiplexing circuit.

Instead, a channel-by-channel frame synchronization circuit is provided, where the low-speed system circuit is reusable, e.g., the frame synchronization circuit of a 2.4 Gbit/s system can be used in a 40 Gbit/s system. This realizes very high-speed systems in a cost effective manner.

Parallel 2.4 Gbit/s signals after being demultiplexed are received by the channel-frame synchronization circuit 60 (see FIGS. 11 and 3B) on a channel-by-channel basis, of course. As shown in FIG. 12, the channel frame synchronization circuit 60 includes an RST 61 and an MST 62 functions, where the RST 61 is for frame synchronization per channel, and error monitoring via B1 byte, while the MST 62 is for error monitoring via B2 byte.

It should be noted that we cannot tell which channel is processed in a certain channel-frame synchronization circuit, because there is no control in the demultiplexing circuit 50. Therefore, we need to connect the output of a certain channel-frame synchronization circuit 60 to an appropriate tributary port. To detect which channel is processed in a certain channel-frame synchronization circuit 60, frame pulses generated from RSTs 61 are used. Frame pulse timing becomes the channel identifier, which was described by using FIG. 6B. For example, the first frame pulse indicates channel 1, second indicates channel 2, the last indicates channel 16, as shown in FIGS. 6A.

Re-calculation of B1 and B2 bytes is necessary for network operation purposes, so an RST 81 and an MST 82 are again used in the channel-frame termination circuit 80 as shown in FIG. 12.

The switching circuit 70 includes several selectors deployed in matrix form as shown in FIG. 13. Each selector is controlled, ON or OFF, by commands initiated from the switching controller circuit 90.

As shown in FIG. 14, the switch controller circuit 90 includes a shift-register 91, exclusive-ORs 92, demultiplexers 93, and a reset-pulse generating circuit 94. Two latch circuits 95 and 96 are employed within the shift-register 91. Synchronizing to the control clock (shift clock), input signal (frame pulse) is latched in the shift-register 95, and, at the same time, output of the shift-register 95 is latched in the shift-register 96. Hence latched data of the shift-registers are different (bit-shifted) in accordance with 1 control clock.

The exclusive-OR 92 is deployed at each channel for connecting its inputs with two outputs of shift-registers 95 and 96, which generates 1-bit pulse when the two adjacent bits are different, 0 to 1 in FS(1) to FS(16).

Demultiplexing the serial output of the exclusive-OR produces 16-bit pattern indicating the position of the rising edge of frame pulse for channel-frame synchronization. For example, the first frame pulse is transformed into (1000000000000000) at an exclusive-OR 92 somewhere in the exclusive-ORs, the last pulse is into (0000000000000001) at another exclusive-C)R 92 somewhere.

Hereafter, a simplified example is explained using FIGS. 15A–15C, where the number of multiplexed channels is 4. As shown in FIG. 15A, in this example, channel-frame phases are shifted in the order channel 1 to 4 in the transmitter. In the receiver, after the demultiplexer, FS(3) is the first frame pulse, the second is FS(4), the third is FS(1), and the last pulse is FS(2). The appropriate connection arrangement is, therefore, FS(3) is channel 1, FS(4) is channel 2, FS(1) is channel 3, and FS(2) is channel 4.

As shown in FIG. 15B, the data output of the exclusive-OR of each branch is (0010) for FS(1), (0001) for FS(2), (1000) for FS(3), (0100) for FS(4) in 4-bit time-sequence. The demultiplexer transforms the 4-bit serial time-sequence into a 4-bit parallel pattern. The 4-bit parallel pattern then directly controls the switching circuit 70.

The reset pulse generating circuit 94 shown in FIG. 14 controls the demultiplexers 93: e.g., if the reset pulse is activated, each demultiplexer generates an all 0 pattern. In the example of FIG. 8, frame pulses exist at the first half-part of the channel-frame period T1. Reset pulses are generated in the second half-part of the channel-frame period, T2 in this example, with the result that no switching command is created in T2 period in the switching control circuit. If new frame pulses are received, reset pulses are deactivated, and demultiplexer re-generates the 4-bit patterns shown in FIG. 15B.

The output C(1) to C(16) of the demultiplexers 93 directly controls the switching circuit 70 as shown in FIG. 15C and FIG. 13. The switching matrix architecture of the switching circuit 70 employs $N^2$ selectors inside the circuit. As can be seen in FIG. 13, each column of selectors is controlled by the output parallel pattern C(1) to C(16) of the demultiplexer 93 (see FIG. 14).

For the example in FIGS. 15A–15C, output pattern C(1) of demultiplexer 93(1), (0010), which is generated based on FS(1) controls the first column of the selectors. The selectors of the first column are set as follows, the first row OFF, second row OFF, third row ON, fourth row OFF. In this operation, the port 1 of the demultiplexing circuit 50 is connected to tributary port 3, and the traversed signal (SG(3)) is recognized as channel 3. The port 2 of the demultiplexing circuit 50 is connected to a tributary port 4, since the switching logic of the second column is, OFF, OFF, OFF, ON for rows 1 to 4, respectively. Ports 3 and 4 of the demultiplexing circuit 50 are connected to tributary ports 1 and 2, respectively.

Embodiment 2

Figure 17:
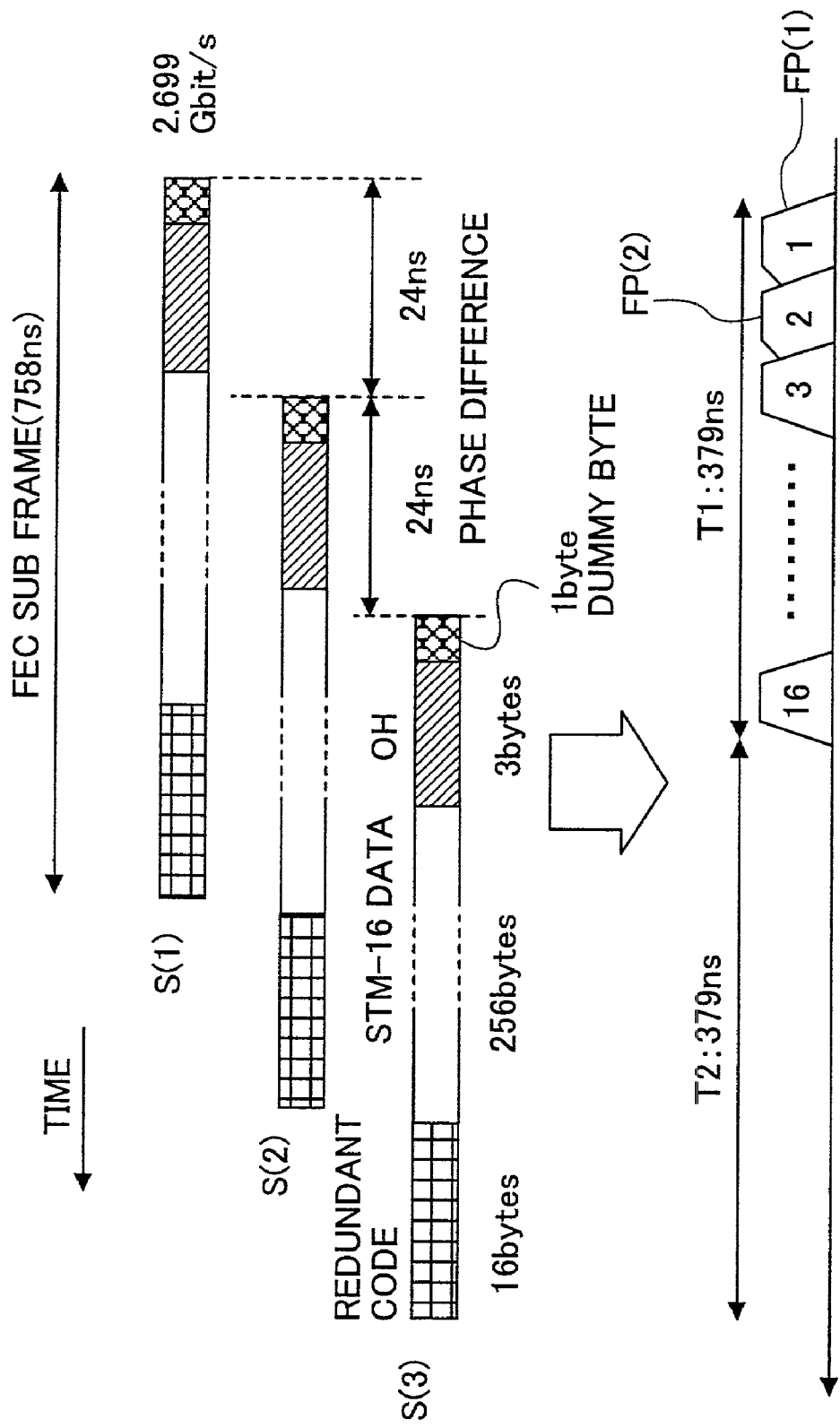
FIG. 17 is a schematic diagram of the time-chart representing the phase relationship among channel-frames in Embodiment 2 of the present invention.
Figure 18:
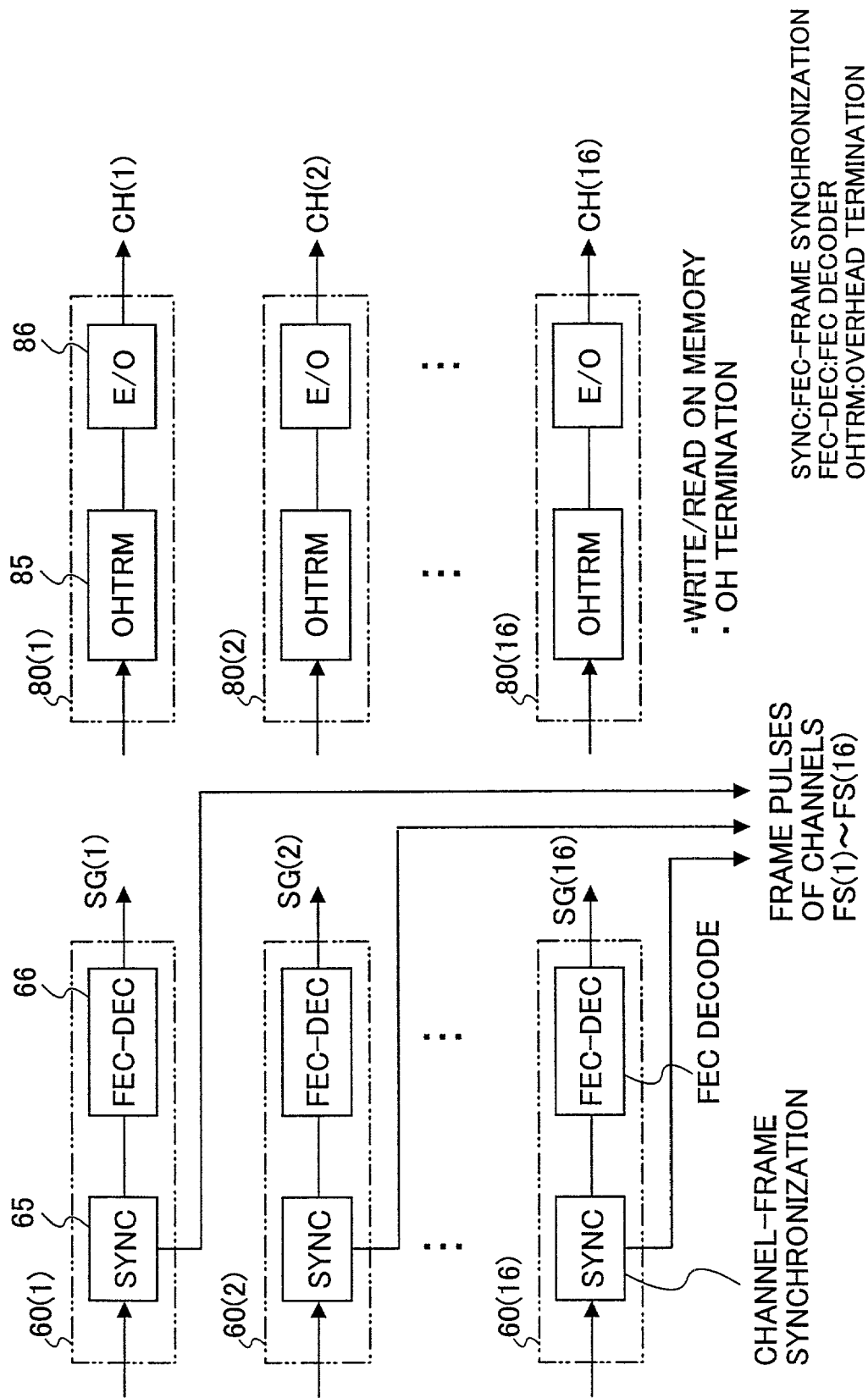
FIG. 18 is a block diagram of the channel synchronization and termination circuits in Embodiment 2 of the present invention.

An embodiment 2 in the present invention is described using FIGS. 16 to 18. FIG. 16 shows a block diagram of the channel-frame generating circuit 10. FIG. 17 illustrates phases of channel-frames generated by the channel-frame generating circuits 10. FIG. 18 shows a block diagram of the channel-frame synchronization circuit 60 and the channel-frame termination circuit 80.

The embodiment 2 is modified from the embodiment 1 with respect to the channel-frame as FEC sub-frame as specified in ITU-T G.975. The channel-frame generating circuit 10 in the transmitter 100, and the channel-frame synchronization circuit 60 and the channel-frame termination circuit 80 in the receiver 200 differ from those in the embodiment 1. Hereafter, only the differences from the embodiment 1 are described; identical parts are omitted from this description of embodiment 2.

As shown in FIG. 16, the channel-L-frame generating circuit 10 includes an O/E (optical-to-electrical conversion) circuit 41, an OH-INS (overhead insertion) circuit 42, and an FEC encoder circuit 43. The O/E 41 executes just optical-to-electrical conversion and also clock extraction from a tributary line. The OH-INS 42 increases bandwidth to allow overhead usage, and inserts actual channel-frame synchronization bytes, where the byte positions are determined from control pulses received from the control pulse generating circuit 30. That is, clock rate conversion according to the overhead added is executed in the OH-INS 42. Usually the OH-INS circuit 42 includes elastic store memory for writing and reading data. Adjusting read-timing in accordance with control pulse makes it possible to control channel-frame phase. Using an accurate read clock frequency can make TDM independent of client clock accuracy.

The FEC encoder circuit 43 is operated according to the channel-frame phase determined in the OH-INS 42, i.e. independently of channels. FIG. 17 illustrates output signals from the FEC encoders 43, S(1), S(2), and S(3) and so on.

In the example of FIG. 17, each channel-frame has an 1 byte dummy, a 3 byte synchronization overhead, and 256 bytes for payload (in the figure STM-16), and 16 bytes for FEC redundancy. Channel-frame phases of channel-frames differ by 24 ns, which is controlled by the control pulse generating circuit 30. Moreover, in this example, T1 (pulses shown) is 379 ns while T2 (no pulse shown) is also 379 ns.

The configuration of the channel-frame synchronization circuit 60 and the channel-frame termination circuit 80 of the receiver 200 is shown in FIG. 18. The channel-frame synchronization circuit 60 includes an FEC-frame synchronization circuit 65 and an FEC decoder 66. The channel-frame termination circuit 80 includes an OH-TERM 85 (overhead termination) for bandwidth reduction to remove overheads, and an electrical-to-optical conversion 86. Modifications described below are applicable; the OH-TERM 85 is employed in the channel-frame synchronization circuit 60, and there is no electrical-to-optical conversion in the channel-frame termination circuit 80.

The channel-frame synchronization circuit 60 detects framing pattern in each channel of the FEC sub-frame, and then transmits frame pulse FS(1) to FS(16) to the switch controller circuit 90. The channel-frame termination circuit 80 is connected to the switching circuit 70, and eliminates the overheads embedded in each channel.

Comparing to the embodiment 1, the embodiment 2 offers advantages in terms of client transparency. There is no need of changing client information including client overheads; channel-frame overheads for system use are newly inserted. On the other hand, the embodiment 1 demands a few changes in SDH applications; e.g., pointer bytes and BIP calculation.

Embodiment 3

Figure 19:
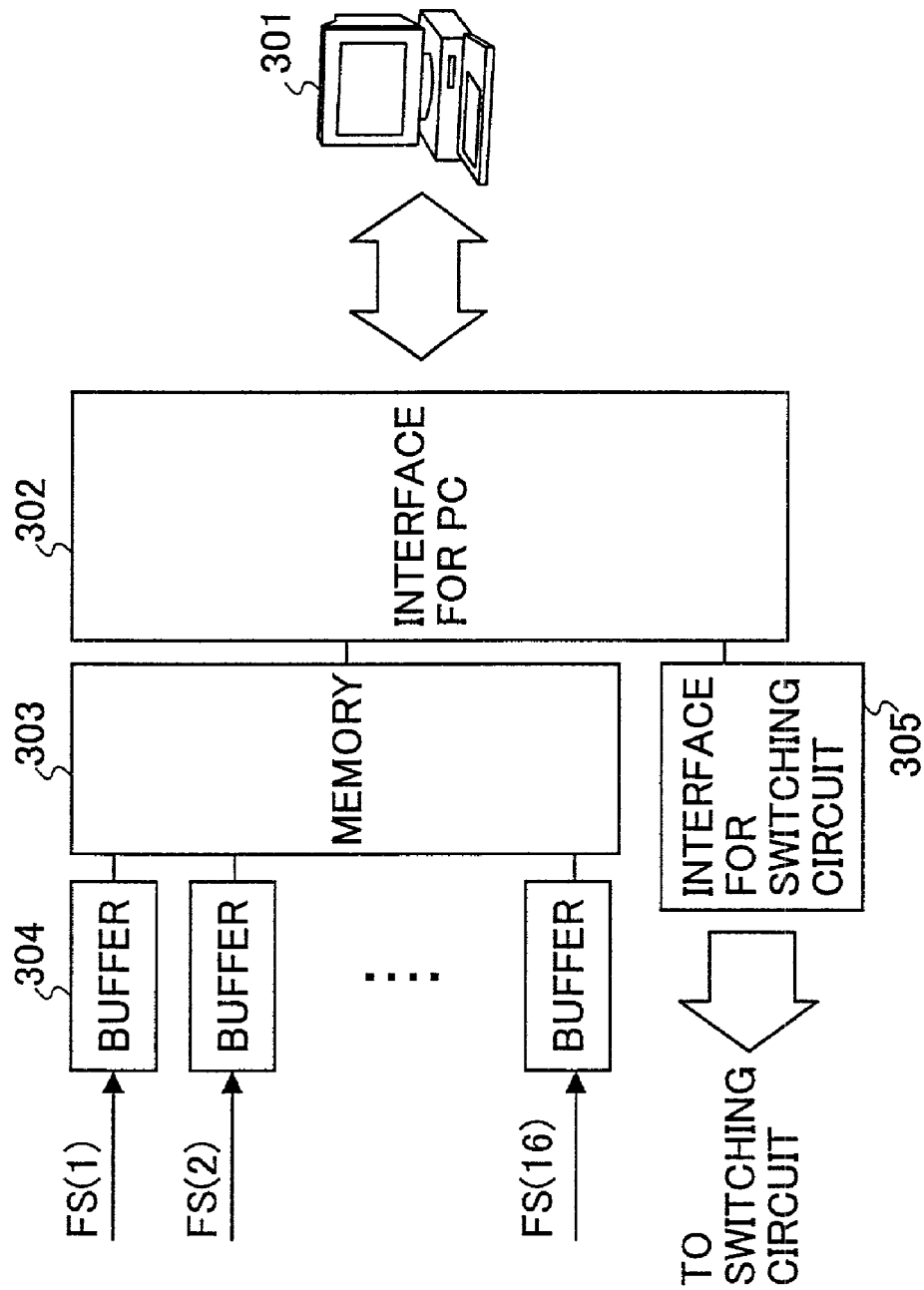
FIG. 19 is a block diagram of the hardware configuration of the switch controller circuit in Embodiment 3 of the present invention.
Figure 20:
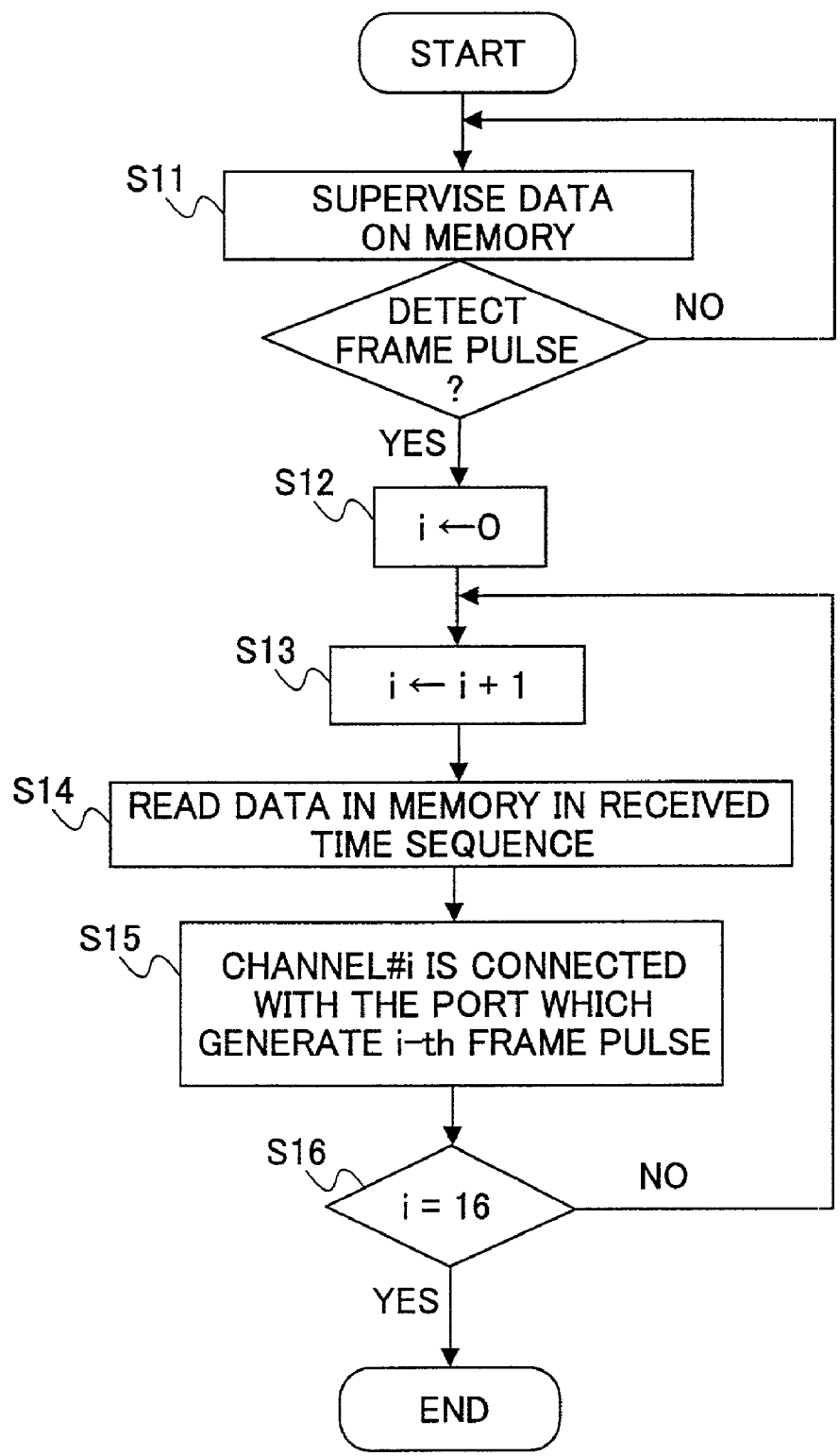
FIG. 20 is a flowchart of the operation of the switch controller circuit in Embodiment 3 of the present invention.

The embodiment 3 is explained using FIGS. 19 and 20. The present invention is advantageous in terms of fast processing, because the frame pulses of the channel-frame synchronization circuit 60 in the receiver directly activate the switching circuit 70 by hardware logic. Note that the present invention also allows the use of software/firmware to implement the switch controller circuit 90.

FIG. 19 shows a hardware configuration example, where the switch controller circuit 90 is realized using computer software. FIG. 20 shows a flow-chart of this example. The embodiment 3 is explained in detail hereafter focusing only on the points different from those of the other embodiments.

In FIG. 19, the switch controller circuit 90 of this embodiment employs a personal computer (PC) 301, an interface for the PC 302, a memory 303, buffers 304, and an interface 305 to the switching circuit 70.

Frame pulses from the channel-frame synchronization circuit 60 are recorded in the memory 303 via the buffers 304. In the example of FIGS. 15A–15C, information group of (0100), (1000), (0001), and (0010) is recorded in the memory 303.

Then, the PC 301 accesses this information group through the PC interface 302, determines switching pattern, controls the switching circuit 70 via the interface 305. The switching pattern is determined from the flow-chart (an example of which is depicted in FIG. 20).

The first step S11 in FIG. 20 verifies whether frame pulses for all channels have been detected. If all pulses have been detected, variable i is cleared in the next step S12, and updated as i+1 in the next step S13. In the following step S14, data is read from the memory 303 time after time. Then, in step S15, the switching circuit 70 is controlled so as to connect. channel no.i with the port holding frame pulse no.i. By retracing steps S13 to S16, all channels are connected to appropriate ports. The embodiment 3 can realize a flexible apparatus that is basically independent of the channel-frame format, SDH, FEC, or other formats.

For the embodiments described above, representative advantages accruing from the present invention are summarized briefly below.

The present invention enables the realization of a very high-speed transmission apparatus in a cost effective manner, because:

(1)-1 there is no need to perform pattern match for high-speed frames, (1)-2 there is no need to control high-speed demultiplexing circuits, which is likely to be configured as a multi-chip module or optical circuit, (1)-3 there is no need for a high-speed scrambler/descrambler circuit.

(2) The present invention enables client transparent transport across server networks while ensuring multiplexing efficiency, an essential requirement in today's systems and those of tomorrow.

The present invention is not limited to the specifically disclosed embodiments, and variations and modifications may be made without departing from the scope of the invention.

What is claimed is:

1. A multiplexing and transmission apparatus which receives low-speed frame signals from a plurality of channels in parallel and outputs a high-speed serial signal, said multiplexing and transmission apparatus comprising:

a control pulses generating circuit which generates control pulses each of which corresponds to one of said channels, wherein said control pulses have different timing for each channel;

channel-frame generating circuits, connected to said control pulses generating circuit, each of which receives said low-speed frame signal and outputs said low-speed frame signal in synchronization with said control pulse so that an output timing of said low-speed frame signal is shifted with respect to an output timing of other low-speed frame signals so that a receiving side apparatus can recognize a channel number of said low-speed frame signal; and a multiplexing circuit, connected to said channel-frame generating circuits, which multiplexes said low-speed frame signals into said high-speed serial signal and outputs said high-speed serial signal.

2. The multiplexing and transmission apparatus as claimed in claim 1, said multiplexing and transmission apparatus further comprising:

synchronization pattern inserting circuits each of which inserts a frame synchronization pattern into said low-speed frame signal.

3. The multiplexing and transmission apparatus as claimed in claim 1, wherein a time duration on which said control pulses are generated for every channel is smaller than a time duration of a channel-frame format.

4. A multiplexing and transmission apparatus which receives a high-speed serial signal, demultiplexes said high-speed serial signal into low-speed frame signals and outputs said low-speed frame signals to a plurality of channels in parallel, said multiplexing and transmission apparatus comprising:

a demultiplexer which demultiplexes said high-speed serial signal into said low-speed frame signals;

channel-frame synchronization circuits, connected to said demultiplexer, each of which receives said low-speed frame signal, generates a frame pulse corresponding to said low-speed frame signal, and outputs said low-speed frame signal;

a switching circuit, connected to said channel-frame synchronization circuits, which receives said low-speed frame signals and sends each of said low-speed frame signals to an appropriate port of said channel; and a switch controller circuit which controls said switching circuit according to said frame pulses output from said channel-frame synchronization circuits, wherein each of said channel-frame synchronization circuits establishes a frame synchronization on a channel-by-channel basis and outputs said frame pulse which indicates a head position of said low-speed frame signal, and said switch controller circuit identifies channel numbers of said low-speed frame signals according to a time difference for receiving said frame pulses, and controls said switching circuit.

5. The multiplexing and transmission apparatus as claimed in claim 4, said switch controller circuit comprising:
a shift register which receives said frame pulses in parallel and shifts each of said frame pulses;
exclusive-OR circuits each of which is connected to said shift register and provided for each frame pulse;
demultiplexers each of which is connected to said exclusive-OR circuit and outputs a pattern indicating time position of said frame pulse;
a reset pulse generating circuit which initializes said demultiplexers according to receiving state of said frame pulse.

6. A multiplexing and transmission apparatus which receives send low-speed frame signals from a plurality of send channels in parallel, outputs a send high-speed serial signal, receives a receive high-speed serial signal, demultiplexes said receive high-speed serial signal into receive low-speed frame signals and outputs said receive low-speed frame signals to a plurality of receive channels in parallel, said multiplexing and transmission apparatus comprising:
a control pulses generating circuit which generates control pulses each of which corresponds to one of said send channels; wherein phases of said control pulses are different for each send channel;
channel-frame generating circuits, connected to said control pulses generating circuit, each of which receives said send low-speed frame signal, and outputs said send low-speed frame signal in synchronization with said control pulse;
a multiplexing circuit, connected to said channel-frame generating circuits, which multiplexes said send low-speed frame signals into said send high-speed serial signal and outputs said send high-speed serial signal;
a demultiplexer which demultiplexes said receive high-speed serial signal into said receive low-speed frame signals;
channel-frame synchronization circuits, connected to said demultiplexer, each of which receives said receive low-speed frame signal, generates a frame pulse corresponding to said receive low-speed frame signal, and outputs said receive low-speed frame signal;
a switching circuit, connected to said channel-frame synchronization circuits, which receives said receive low-speed frame signals and sends each of said receive low-speed frame signals to an appropriate port of said receive channel; and
a switch controller circuit which controls said switching circuit according to said frame pulses output from said channel-frame synchronization circuits,
wherein each of said channel-frame synchronization circuits establishes a frame synchronization on a channel-by-channel basis and outputs said frame pulse which indicates a head position of said low-speed frame signal, and
said switch controller circuit identifies channel numbers of said low-speed frame signals according to a time difference for receiving said frame pulses, and controls said switching circuit.

7. A multiplexing and transmission apparatus which receives low-speed frame signals from a plurality of channels in parallel and outputs a high-speed serial signal, said multiplexing and transmission apparatus comprising:
a control pulses generating circuit which generates control pulses each of which corresponds to one of said channels, wherein phases of said control pulses are different for each channel;
channel-frame generating circuits, connected to said control pulses generating circuit, each of which receives said low-speed frame signal and outputs said low-speed frame signal in synchronization with said control pulse; and
a multiplexing circuit, connected to said channel-frame generating circuits, which multiplexes said low-speed frame signals into said high-speed serial signal and outputs said high-speed serial signal;
wherein time duration on which said control pulses are generated for every channel is smaller than time duration of channel-frame format, and
wherein said control pulses generating circuit includes:
a control clock generator;
a DC voltage generator;
a selector which outputs said control pulses sequentially for each channel according to control clock supplied from said control clock generator, said control pulses generated according to signals supplied from said DC voltage generator.

8. A computer readable medium storing program code for causing a computer to control a switching circuit in an multiplexing and transmission apparatus which receives a high-speed serial signal and demultiplexes said high-speed serial signal into low-speed frame signals, wherein said switching circuit assigns each of said low-speed frame signals to an appropriate port of a channel, said computer readable medium comprising:
program code means for receiving and storing frame pulses indicating head positions of said low-speed frame signals;
program code means for checking whether said frame pulses for every channel are stored;
program code means for reading said frame pulses and identifying receiving order of said low-speed frame signals; and
program code means for controlling said switching circuit on the basis of said receiving order so that said switching circuit assigns each of said low-speed frame signals to an appropriate port of a channel.

9. A multiplexing and transmission method used in an apparatus which receives low-speed frame signals from a plurality of channels in parallel and outputs a high-speed serial signal, said multiplexing and transmission method comprising the steps of:
generating control pulses each of which corresponds to one of said channels, wherein said control pulses have different timing for each channel;
receiving said low-speed frame signal and outputting said low-speed frame signal in synchronization with said control pulse for each of said low-speed frame signals so that an output timing of said low-speed frame signal is shifted with respect to an output timing of other low-speed frame signals so that a receiving side apparatus can recognize a channel number of said low-speed frame signal; and
multiplexing said low-speed frame signals into said high-speed serial signal and outputting said high-speed serial signal.

10. The multiplexing and transmission method as claimed in claim 9, said multiplexing and transmission method further comprising the step of:

inserting, for each of said low-speed frame signal, a frame synchronization pattern into said low-speed frame signal.

11. The multiplexing and transmission method as claimed in claim 9, wherein a time duration on which said control pulses are generated for every channel is smaller than a time duration of a channel-frame format.

12. A multiplexing and transmission method used in an apparatus which receives a high-speed serial signal, demultiplexes said high-speed serial signal into low-speed frame signals and outputs said low-speed frame signals to a plurality of channels in parallel, said multiplexing and transmission method comprising the steps of:
   demultiplexing said high-speed serial signal into said low-speed frame signals;
   generating, for each of said low-speed frame signals, a frame pulse corresponding to said low-speed frame signal;
   switching each of said low-speed frame signals to an appropriate port of said channel according to signals generated from said frame pulses;
   wherein the generating includes establishing a frame synchronization on a channel-by-channel basis and outputting said frame pulse which indicates a head position of said low-speed frame signal for each of said received low-speed frame signals, and
   the switching includes identifying channel numbers of said low-speed frame signals according to a time difference of said frame pulses, and performing the switching according to said time difference.

13. The multiplexing and transmission method as claimed in claim 12, said multiplexing and transmission method further comprising the steps of:
   shifting each of said frame pulses;
   performing an exclusive-OR operation on said frame pulses;
   generating a pattern indicating time position of said frame pulse for each of said frame pulses.

14. A multiplexing and transmission method used in an apparatus which receives send low-speed frame signals from a plurality of send channels in parallel, outputs a send high-speed serial signal, receives a receive high-speed serial signal, demultiplexes said receive high-speed serial signal into receive low-speed frame signals and outputs said receive low-speed frame signals to a plurality of receive channels in parallel, said multiplexing and transmission method comprising the steps of:
   generating control pulses each of which corresponds to one of said send channels, wherein phases of said control pulses are different for each send channel;
   receiving said send low-speed frame signal and outputting said send low-speed frame signal in synchronization with said control pulse for each of said send low-speed frame signals; and
   multiplexing said send low-speed frame signals into said send high-speed serial signal and outputting said send high-speed serial signal;
   demultiplexing said receive high-speed serial signal into said receive low-speed frame signals;
   generating, for each of said receive low-speed frame signals, a frame pulse corresponding to said receive low-speed frame signal;
   switching each of said receive low-speed frame signals to an appropriate port of said receive channel according to signals generated from said frame pulses,
   wherein the generating includes establishing a frame synchronization on a channel-by-channel basis and outputting said frame pulse which indicates a head position of said low-speed frame signal for each of said received low-speed frame signals, and
   the switching includes identifying channel numbers of said low-speed frame signals according to a time difference of said frame pulses, and performing the switching according to said time difference.

15. A multiplexing and transmission method used in an apparatus which receives low-speed frame signals from a plurality of channels in parallel and outputs a high-speed serial signal, said multiplexing and transmission method comprising the steps of:
   generating control pulses each of which corresponds to one of said channels, wherein phases of said control pulses are different for each channel;
   receiving said low-speed frame signal and outputting said low-speed frame signal in synchronization with said control pulse for each of said low-speed frame signals;
   multiplexing said low-speed frame signals into said high-speed serial signal and outputting said high-speed serial signal; and
   a selector in said apparatus outputting said control pulses sequentially for each channel according to control clock supplied from a control clock generator, said control pulses generated according to signals supplied from a DC voltage generator;
   wherein a time duration on which said control pulses are generated for every channel is smaller than a time duration of a channel-frame format.

16. A method used in a computer to control a switching circuit in an multiplexing and transmission apparatus which receives a high-speed serial signal and demultiplexes said high-speed serial signal into low-speed frame signals, wherein said switching circuit assigns each of said low-speed frame signals to an appropriate port of a channel, said method comprising the steps of:
   receiving and storing frame pulses indicating head positions of said low-speed frame signals;
   checking whether said frame pulses for every channel are stored;
   reading said frame pulses and identifying receiving order of said low-speed frame signals; and
   controlling said switching circuit on the basis of said receiving order so that said switching circuit assigns each of said low-speed frame signals to an appropriate port of a channel.

* * * * *

UNITED STATES PATENT AND TRADEMARK OFFICE
CERTIFICATE OF CORRECTION

PATENT NO. : 7,095,758 B2  
APPLICATION NO. : 09/882324  
DATED : August 22, 2006  
INVENTOR(S) : Masahito Tomizawa et al.

It is certified that error appears in the above-identified patent and that said Letters Patent is hereby corrected as shown below:

Column 4, line 65, change "present : invention" to --present invention--

Column 8, line 23, change "Ls also" to --is also--

Column 10, line 28, change "channel-L-frame" to --channel-frame--

Column 11, line 49, change "connect. channel" to --connect channel--

Signed and Sealed this

Eighth Day of May, 2007

JON W. DUDAS  
*Director of the United States Patent and Trademark Office*